(12) United States Patent
Jung et al.

(10) Patent No.: US 11,175,852 B2
(45) Date of Patent: Nov. 16, 2021

(54) STORAGE DEVICE AND OPERATION METHOD THEREOF

(71) Applicant: Samsung Electronics Co., Ltd., Suwon-si (KR)

(72) Inventors: Sangwon Jung, Busan (KR); Mincheol Kwon, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/944,368

(22) Filed: Jul. 31, 2020

(65) Prior Publication Data
US 2021/0034283 A1 Feb. 4, 2021

(30) Foreign Application Priority Data
Aug. 2, 2019 (KR) ........................ 10-2019-0094231

(51) Int. Cl.
*G06F 3/06* (2006.01)
(52) U.S. Cl.
CPC ............ *G06F 3/0655* (2013.01); *G06F 3/061* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 9,015,403 B2 | 4/2015 | Jeong et al. | |
| 9,223,506 B2 | 12/2015 | Yoon et al. | |
| 9,229,640 B2 | 1/2016 | Sankar et al. | |
| 9,367,250 B2 | 6/2016 | Tressler et al. | |
| 9,645,769 B2 | 5/2017 | Chadha et al. | |
| 10,025,522 B2 | 7/2018 | Helmick | |
| 2007/0198679 A1* | 8/2007 | Duyanovich | G06F 11/3452 709/223 |
| 2012/0047317 A1* | 2/2012 | Yoon | G06F 3/0679 711/103 |
| 2018/0284857 A1 | 10/2018 | Yang et al. | |

* cited by examiner

*Primary Examiner* — Jane Wei
(74) *Attorney, Agent, or Firm* — Muir Patent Law, PLLC

(57) ABSTRACT

An method of a storage device configured to communicate with an external device through an interface channel includes: storing a throttling predefined table (PDT) including a relationship between target performances and workload characteristics; detecting that a first workload characteristic has changed; determining whether to update the PDT; when it is determined to update the PDT, monitoring a performance of the storage device; updating the PDT to include at least one new value for the workload characteristics and an additional target throttling performance value, based on a calculated monitored performance and the changed value of the first workload characteristic; controlling an operation parameter based on the updated PDT such that the interface channel has a first throttling performance corresponding to the additional target throttling performance value; receiving a first request through the interface channel from the external device; and processing the first I/O request through the interface channel.

16 Claims, 17 Drawing Sheets

FIG. 5

1211
[PDT]

| Queue Depth | State | Performance |
|---|---|---|
| QD1 | ST1 | Perf_11 |
| | ⋮ | ⋮ |
| | STn | Perf_1n |
| QD2 | ST1 | Perf_21 |
| | ⋮ | ⋮ |
| | STn | Perf_2n |
| ⋮ | ⋮ | ⋮ |
| QDm | ST1 | Perf_m1 |
| | ⋮ | ⋮ |
| | STn | Perf_mn |

Workload: Queue Depth, State
Throttling Performance: Performance

STORAGE DEVICE AND OPERATION METHOD THEREOF

CROSS-REFERENCE TO RELATED APPLICATIONS

This application claims priority under 35 U.S.C. § 119 to Korean Patent Application No. 10-2019-0094231 filed on Aug. 2, 2019, in the Korean Intellectual Property Office, the disclosure of which is incorporated by reference herein in its entirety.

BACKGROUND

Embodiments of the inventive concept described herein relate to a semiconductor memory, and more particularly, relate to a storage device and an operation method thereof.

A semiconductor memory device is classified as a volatile memory device, in which stored data disappear when a power is turned off, such as a static random access memory (SRAM) or a dynamic random access memory (DRAM), or a nonvolatile memory device, in which stored data are retained even when a power is turned off, such as a flash memory device, a phase-change RAM (PRAM), a magnetic RAM (MRAM), a resistive RAM (RRAM), or a ferroelectric RAM (FRAM).

Flash memory devices are being widely used as a high-capacity storage medium for computing systems. Various management operations for managing a flash memory-based high-capacity storage medium are performed in the storage medium due to a physical characteristic (e.g., write after erase) of the flash memory. The performance of the flash memory-based high-capacity storage medium may change due to the management operations.

SUMMARY

Embodiments of the inventive concept provide a storage device with improved performance and an operation method thereof.

According to some embodiments, an operation method of a storage device configured to communicate with an external device through an interface channel includes a plurality of steps. The steps include storing a throttling predefined table (PDT), the PDT including a relationship between a plurality of target throttling performances and information about a plurality of workload characteristics; detecting that a value of a first workload characteristic of the plurality of workload characteristics has changed during operation of the storage device; determining whether to update the PDT; when it is determined to update the PDT, monitoring a performance of the storage device to calculate a monitored performance; updating the throttling PDT to include at least one new value for the workload characteristics and an additional target throttling performance value, based on first information including the calculated monitored performance and the changed value of the first workload characteristic; controlling an operation parameter based on the updated throttling PDT such that the interface channel has a first throttling performance corresponding to the additional target throttling performance value; receiving a first input/output (I/O) request through the interface channel having the first throttling performance from the external device; and processing a first operation corresponding to the first I/O request through the interface channel having the first throttling performance.

According to some embodiments, n operation method of a storage device configured to communicate with an external device through an interface channel includes: determining, from among a plurality of target throttling performance values, a first target throttling performance value corresponding to current values for a plurality of workload characteristics, based on a throttling predefined table (PDT) including a relationship between the plurality of target throttling performance values and particular value sets for the plurality of workload characteristics; setting a first operation parameter such that the interface channel has a first throttling performance that corresponds to the first target throttling performance value; processing a first input/output (I/O) request received from the external device through the interface channel having the first throttling performance; when the value of at least one of the plurality of workload characteristics has changed: re-setting the at least one operation parameter such that the interface channel has a normal performance without throttling, and monitoring the normal performance of the storage device to calculate a monitored performance; and updating the throttling PDT to include a new value set for the plurality of workload characteristics and a corresponding additional target throttling performance value, based on the changed value of at least one of the plurality of workload characteristics and the calculated monitored performance.

According to some embodiments, a storage device includes a nonvolatile memory device and a controller configured to control the nonvolatile memory device and to communicate with an external device through an interface channel. The controller includes: a host interface circuit configured to communicate with the external device through the interface channel; a memory configured to store a throttling predefined table (PDT) including a relationship between a plurality of target throttling performance values and a plurality of value sets, each set including a value for each of a plurality of workload characteristics; a throttling manager configured to determine, from among the plurality of target throttling performance values in the throttling PDT, a first target throttling performance value corresponding to a current operational value set for the plurality of workload characteristics, and to set at least one operation parameter of the host interface circuit such that the interface channel has a first throttling performance corresponding to the first target throttling performance value; and a PDT updating module configured to monitor the plurality of workload characteristics, wherein, during operation of the nonvolatile memory device, when a value of at least one workload characteristic of the plurality of workload characteristics has changed, the PDT updating module monitors a performance of the interface channel to calculate a monitored performance and updates the throttling PDT based on the changed value and the monitored performance.

BRIEF DESCRIPTION OF THE FIGURES

The above and other objects and features of the inventive concept will become apparent by describing in detail example embodiments thereof with reference to the accompanying drawings.

FIG. 5 is a diagram illustrating a throttling PDT of FIG. 1 according to example embodiments.

DETAILED DESCRIPTION

Below, embodiments of the inventive concept may be described in detail and clearly to such an extent that an ordinary one in the art easily implements the inventive concept.

The terms "unit", "module", etc. to be used in the specification may be implemented in the form of hardware, software, or a combination thereof configured to perform various functions to be described in the specification.

Figure 1:
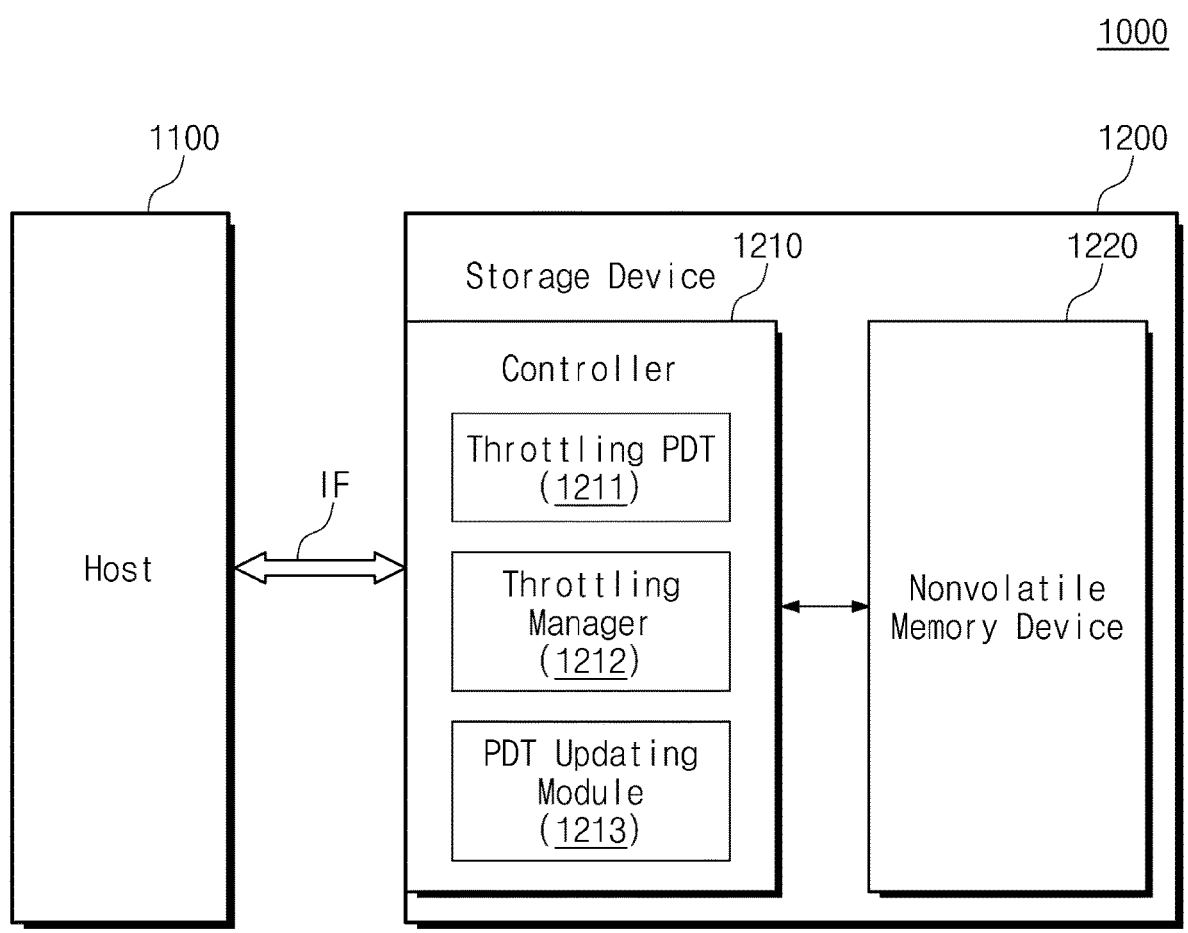
FIG. 1 is a block diagram illustrating a storage system according to an embodiment of the inventive concept.
Figure 2A:
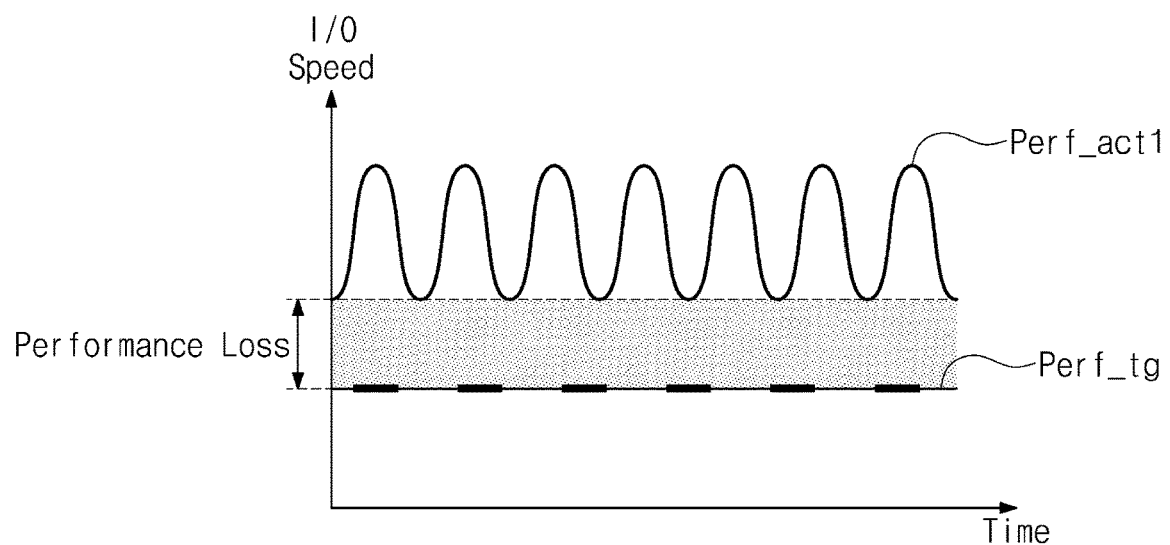
FIGS. 2A and 2B are diagrams for describing a throttling operation of a storage device.
Figure 2B:
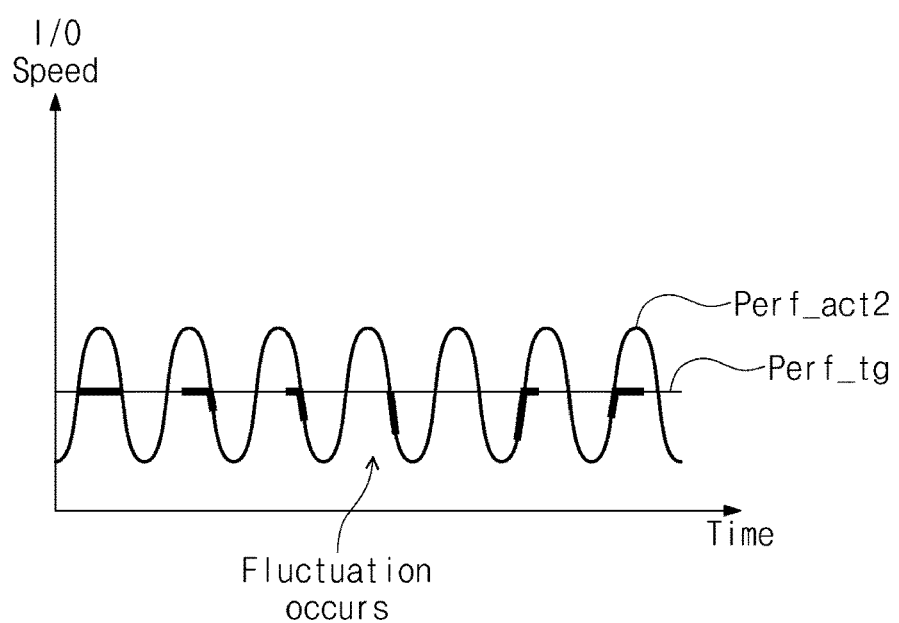

FIG. 1 is a block diagram illustrating a storage system according to an embodiment of the inventive concept. FIGS. 2A and 2B are diagrams for describing a throttling operation of a storage device. In FIGS. 2A and 2B, a horizontal axis represents a time, and a vertical axis represents an I/O speed. The I/O speed may be a read speed of the storage device 1200 or a write speed of the storage device 1200 and indicated as MB/s. A unit of the time may be a second. However, the inventive concept is not limited thereto.

Referring to FIG. 1, a storage system 1000 may include a host 1100 and a storage device 1200. In an example embodiment, the storage system 1000 may be a computing system, which is configured to process various information, such as a personal computer (PC), a notebook, a laptop, a server, a workstation, a tablet PC, and a smartphone.

The host 1100 may be configured to control overall operations of the storage system 1000. The storage device 1200 may be used as a high-capacity storage medium of the storage system 1000. In an example embodiment, the storage device 1200 may be a solid state drive (SSD) mounted on the host 1100. Alternatively, the storage device 1200 may be a memory card that is removable from the host 1100.

The storage device 1200 may include a controller 1210 and a nonvolatile memory device 1220. In response to a request of the host 1100, the controller 1210 may store data in the nonvolatile memory device 1220 or may read data stored in the nonvolatile memory device 1220.

Under control of the controller 1210, the nonvolatile memory device 1220 may store data or may provide data stored therein to the controller 1210. In an example embodiment, the nonvolatile memory device 1220 may be a NAND flash memory device, but the inventive concept is not limited thereto.

In an example embodiment, the host 1100 and the storage device 1200 may exchange data through an interface channel IF. For example, through the interface channel IF, the host 1100 may transfer data to the storage device 1200 or may receive data from the storage device 1200. In an example embodiment, a transfer speed of data through the interface channel IF (or the size of data exchanged per unit time) may be used as a performance index of the storage device 1200. In an example embodiment, the performance of the storage device 1200 may indicate the performance of the interface channel IF. Alternatively, the performance of the storage device 1200 may indicate a transfer speed of data through the interface channel IF.

Below, for convenience of description, the term "performance of the storage device 1200" is used. Unless defined differently, the performance of the storage device 1200 may mean the amount of data exchanged between the storage device 1200 and the host 1100 per unit time or a data transfer speed. The performance of the storage device 1200 may be expressed by using various indexes such as a random read, a random write, a sequential write, and a sequential read.

In an example embodiment, under a particular situation, the performance of the storage device 1200 may not be maintained uniformly. For example, a write time during which an operation corresponding to the same write request is completed may vary depending on a physical characteristic or various environment variables (e.g., the size of a buffer memory and an available memory capacity in a nonvolatile memory device) of the nonvolatile memory device 1220. This difference of write time may cause performance fluctuations of the storage device 1200. For example, the performance fluctuations may occur in the storage device 1200 depending on various environment variables.

The storage device 1200 may perform a throttling operation for the purpose of providing a uniform performance. The throttling operation indicates an operation maintaining the performance of the storage device 1200 uniformly by adjusting various operation parameters in the storage device 1200. In an example embodiment, various parameters may indicate various operation parameters, which are associated with the performance of the storage device 1200 (i.e., a speed of an I/O exchanged through the interface channel IF), such as a buffer memory and a command queue. For example, if the storage device 1200 performs the throttling operation, a clock speed of the buffer memory may decrease or a queue depth of the command queue may decrease, thereby the speed of the I/O may decrease. However, the inventive concept is not limited thereto. The storage device 1200 may perform the throttling operation for providing a uniform performance by controlling the various operation parameters described above.

A conventional storage device performs a throttling operation under a particular condition (e.g., a temperature condition). For example, in the case where the particular condition is satisfied, the conventional storage device performs the throttling operation depending on a given (or fixed) target performance or throttling performance. However, because an actual performance of a storage device varies depending on an operating environment of the storage device, in the case where the throttling operation is performed based on the fixed target performance or throttling performance, performance loss may occur, or the throttling operation may not be performed normally such that the performance fluctuations may not disappear.

For example, as illustrated in FIG. 2A, in the case where the throttling operation is performed such that a storage device having an actual performance marked by a first performance graph Perf_act1 has a target performance Perf_tg, performance loss occurs as much as a difference between a minimum performance of the first performance graph Perf_act1 and the target performance Perf_tg. That is, because the actual performance of the storage device is higher than the target performance Perf_tg, as the throttling operation is performed based on the fixed target performance Perf_tg, a performance of the storage device loss may occur.

Alternatively, as illustrated in FIG. 2B, in the case where the throttling operation is performed such that a storage device having an actual performance marked by a second performance graph Perf_act2 has the target performance Perf_tg, an effect that is obtained through the throttling operation may be slight. For example, because the minimum value of the second performance graph Perf_act2 is lower than the target performance Perf_tg, the throttling operation may not be performed normally. For this reason, the performance fluctuations may not be removed. For example, there may be no effect that is obtained through the throttling operation.

As described above, because the conventional storage device performs the throttling operation based on a given target performance without consideration of an actual performance, issues such as performance loss or occurrence of performance fluctuations may be caused.

The storage device 1200 according to an embodiment of the inventive concept may perform an adaptive throttling operation or a dynamic throttling operation based on an actual performance of the storage device 1200. For example, returning to FIG. 1, the controller 1210 of the storage device 1200 may include a throttling predefined table (PDT) 1211, a throttling manager 1212, and a PDT updating module 1213.

The throttling PDT 1211 may include a relationship between a plurality of workloads and information (e.g., an average performance or a minimum performance) about a throttling performance. In an example embodiment, a workload, which may also be described as a data processing characteristic set, may include various indexes, each of which represents a data processing characteristic, and which are associated with an operation of the storage device 1200. An example data processing characteristic set (also described as "workload" or "workload characteristic set") includes one or more of an external write, an external read, a write amplification factor (WAF), a write queue depth, a read queue depth, a write command ratio, a read command ratio, a write sector size, a read sector size, and temperature information. For example, a given data processing operation may have a particular data processing characteristic set associated with it. The set may be defined to include certain characteristics, such as in the case of a write operation: an external write, a WAF, a write queue depth, a write command ratio, a write sector size, and temperature information. The throttling performance may indicate a target performance (e.g., desired performance) of the storage device 1200 in a state where the throttling operation is performed, and may be described as a target throttling performance (the table may include a plurality of target throttling performance values). Herein, the write/read queue depth may represent the number of write/read commands in a predetermined period, and the write/read command ratio may represent a ratio of the number of commands from write/read commands to read/write commands in a predetermined period. As shown in FIG. 5, described more below, a plurality of workload values, or workload characteristic values, may be associated with a plurality of throttling performance values, respectively.

The throttling manager 1212 may perform the throttling operation based on a current (e.g., operational) workload value of the storage device 1200 and the throttling PDT 1211. For example, the throttling manager 1212 may detect a current operational workload value or a changed operational workload value of the storage device 1200 and may search the throttling PDT 1211 for information about a throttling performance corresponding to the detected workload value. For example, a current operational workload value may refer to Queue Depth QD1 and State ST1 for the workload defined as including Queue Depth and State shown in FIG. 5, and may include a value set including QD1 and ST1. The corresponding information about throttling performance in this case is Perf_11. Subsequently, a changed operational workload value may refer to Queue Depth QD2 and State ST1 for the workload defined as including Queue Depth and State shown in FIG. 5. The corresponding information about throttling performance in this case is Perf_21.

The throttling manager 1212 may perform the throttling operation based on the searched and retrieved throttling performance. For example, the throttling manager 1212 may control various operation parameters of the storage device 1200 such that the performance of the storage device 1200 satisfies the retrieved throttling performance or a fluctuation level corresponding to the retrieved throttling performance.

The PDT updating module 1213 may be configured to update the throttling PDT 1211 under a particular condition. For example, the PDT updating module 1213 may monitor an operational workload value and an actual performance (e.g., an average performance) of the storage device 1200. In the case where the operational workload value of the storage device 1200 has changed, the PDT updating module 1213 may update the throttling PDT 1211 based on the monitored performance and the changed workload value. In an example embodiment, the monitored performance may indicate an actual average performance or an actual minimum performance of the storage device 1200. In an embodiment, a target performance for the throttling operation may be determined based on the monitored performance.

In an example embodiment, the throttling manager 1212 may perform the throttling operation on the storage device 1200, which operates based on the changed workload value, based on the throttling manager 1212 thus updated.

As described above, the storage device 1200 according to an embodiment of the inventive concept may monitor an operational workload value and an actual performance; when the operational workload value is changed, the storage device 1200 may update the throttling PDT 1211 based on the monitored performance. Accordingly, because the throttling operation is performed based on an actual performance of the storage device 1200, issues such as performance loss or performance fluctuations may be addressed compared to the conventional scheme to perform the throttling operation based on a fixed target performance. Accordingly, the storage device 1200 with improved performance may be provided.

Figure 3:
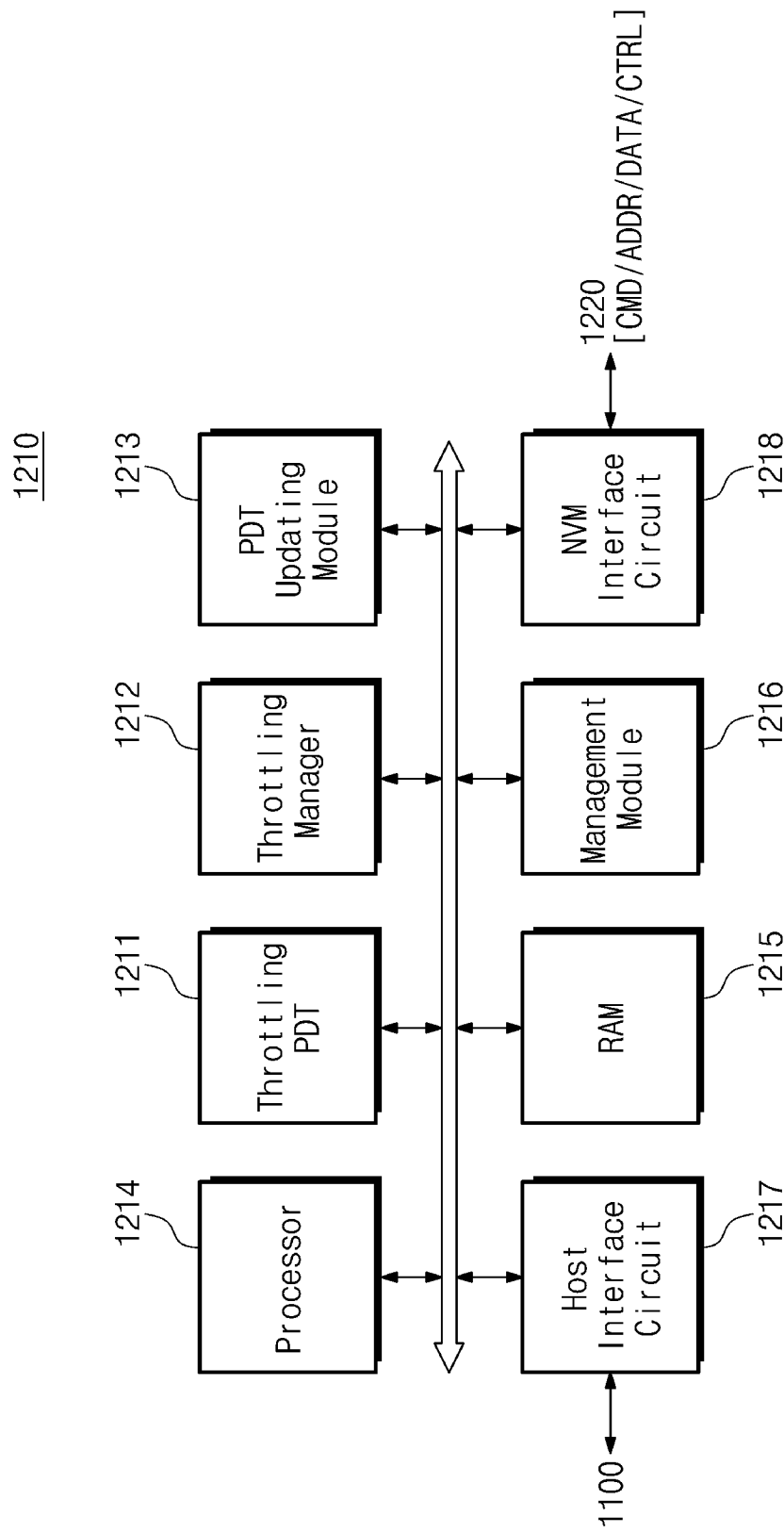
FIG. 3 is a block diagram illustrating a controller of FIG. 1 according to example embodiments.

FIG. 3 is a block diagram illustrating the controller 1210 of FIG. 1 in detail. Referring to FIGS. 1 and 3, the controller 1210 may include the throttling PDT 1211, the throttling manager 1212, the PDT updating module 1213, a processor 1214, a random access memory (RAM) 1215, a management module 1216, a host interface circuit 1217, and a nonvolatile memory interface circuit 1218. The throttling PDT 1211, the throttling manager 1212, and the PDT updating module 1213 are described above, and thus, additional description will be omitted to avoid redundancy.

The processor 1214 may control overall operations of the controller 1210. The RAM 1215 may be used as a working memory, a cache memory, or a buffer memory of the controller 1210. The RAM 1215 may store or manage various information necessary for the controller 1210 to operate.

In an example embodiment, the throttling PDT 1211, the throttling manager 1212, and the PDT updating module 1213 may be implemented in the form of software, hardware, and a combination thereof. The throttling PDT 1211, the throttling manager 1212, and the PDT updating module 1213 implemented in the form of software may be stored in the RAM 1215. The throttling PDT 1211, the throttling manager 1212, and the PDT updating module 1213 stored in the RAM 1215 may be driven or managed by the processor 1214.

The management module 1216 may be configured to perform various management operations necessary for the storage device 1200 to operate. For example, the management module 1216 may include a flash translation layer (FTL) that is configured to perform various management operations for an efficient operation between the host 1100 and the nonvolatile memory device 1220. The management module 1216 may perform various management operations, such as a garbage collection operation, a bad block replacing operation, a wear-leveling operation, and a mapping table managing operation, such that the storage device 1200 is efficiently used.

The controller 1210 may communicate with the host 1100 through the host interface circuit 1217. In an example embodiment, the host interface circuit 1217 may be implemented based on a communication scheme corresponding to the interface channel IF. For example, host interface circuit 1217 may include at least one of various interfaces such as a SATA (Serial ATA) interface, a PCIe (Peripheral Component Interconnect Express) interface, a SAS (Serial Attached SCSI) interface, an NVMe (Nonvolatile Memory express) interface, and an UFS (Universal Flash Storage) interface. In an example embodiment, in the case where the throttling operation is performed, the interface channel IF may have the corresponding throttling performance. In an example embodiment, the storage device 1200 may set or control operation parameters associated with an operation of the host interface circuit 1217 such that the interface channel IF has the corresponding throttling performance.

The controller 1210 may communicate with the nonvolatile memory device 1220 through the nonvolatile memory interface circuit 1218. In an example embodiment, the nonvolatile memory interface circuit 1218 may be implemented based on a NAND interface. The nonvolatile memory interface circuit 1218 may exchange a command CMD, an address ADDR, data "DATA", or a control signal CTRL with the nonvolatile memory device 1220.

Figure 4:
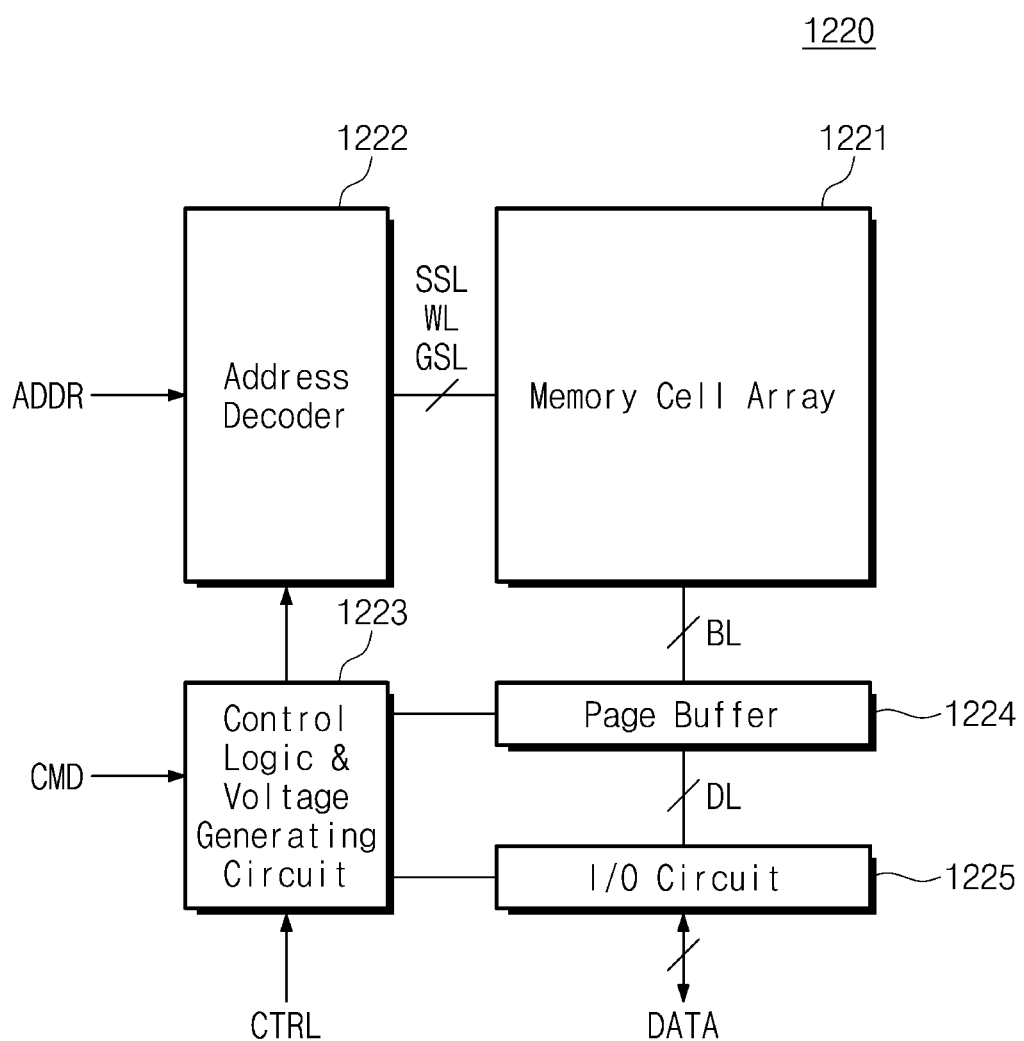
FIG. 4 is a block diagram illustrating a nonvolatile memory device of a storage device of FIG. 1 according to example embodiments.

FIG. 4 is a block diagram illustrating the nonvolatile memory device of the storage device of FIG. 1 according to example embodiments. In an embodiment of FIG. 4, the nonvolatile memory device 1220 may be a NAND flash memory device, but the inventive concept is not limited thereto.

Referring to FIGS. 1, 3, and 4, the nonvolatile memory device 1220 may include a memory cell array 1221, an address decoder 1222, a control logic and voltage generating circuit 1223, a page buffer 1224, and an input/output circuit 1225. The memory cell array 1221 may include a plurality of memory blocks. Each of the plurality of memory blocks may include a plurality of cell strings, each of which includes a plurality of cell transistors connected in series between a bit line and a common source line. The plurality of cell transistors may be connected with string selection lines SSL, word lines WL, and ground selection lines GSL.

The address decoder 1222 may be connected with the memory cell array 1221 through the string selection lines SSL, the word lines WL, and the ground selection lines GSL. The address decoder 1222 may receive the address ADDR from the controller 1210. The address decoder 1222 may decode the address ADDR and may control voltages of the string selection lines SSL, the word lines WL, and the ground selection lines GSL based on the decoded result.

The page buffer 1224 may be connected with the memory cell array 1221 through bit lines BL. The page buffer 1224 may be configured to temporarily store data to be stored in the memory cell array 1221 or data read from the memory cell array 1221.

The input/output circuit 1225 may provide the data "DATA" received from the controller 1210 to the page buffer 1224 through data lines DL or may provide the data "DATA" received from the page buffer 1224 through the data lines DL to the controller 1210. In an example embodiment, the input/output circuit 1225 may exchange the data "DATA" with the memory controller 1210 in synchronization with a data strobe signal (DQS) (not illustrated).

The control logic and voltage generating circuit 1223 may control overall operations of the nonvolatile memory device 1220. For example, the control logic and voltage generating circuit 1223 may control the respective components of the nonvolatile memory device 1220 based on the command CMD or the control signal CTRL from the controller 1210 such that the nonvolatile memory device 1220 performs various operations (e.g., a program operation, a read operation, and an erase operation).

FIG. 5 is a diagram illustrating the throttling PDT of FIG. 1 according to example embodiments. Below, for convenience of description, the term "workload," which normally refers to an amount of processing to be or being performed, may be used to refer to one or more characteristics of a data processing operation (e.g., a data processing characteristic set). For example, a workload may refer to a set including one or more of an external write request, an external read request, a write amplification factor (WAF), a write queue depth, a read queue depth, a write command ratio, a read command ratio, a write sector size, a read sector size, and temperature information as described above. For example, the workload may refer to information about one index or a set in which at least two or more indexes are combined. The term "data processing characteristic set" may be used instead of "workload" to refer to the above-listed items. Also, any one of the above-listed "workloads" may be referred to as a "workload characteristic," and may have a workload characteristic value, or workload value.

Referring to FIGS. 1 and 5, the throttling PDT 1211 may include information about a throttling performance associated with each of a plurality of stored workload values. For example, a workload (or data processing characteristic set)

may be defined to include a command queue depth and state information. For example, a plurality of states ST1 to STn may be present for each of plurality of queue depth information QD1 to QDm, and throttling performances Perf_11 to Perf_mn may be respectively mapped onto the plurality of states ST1 to STn for each queue depth. A particular queue depth paired with a particular state may be described as a workload "value," and a particular set of values for a set of corresponding workload characteristics (e.g., associated with a single throttling performance value in the throttling PDT 1211) may be described as a particular value set. A current operational value set for a set of corresponding workload characteristics refers to the present state of the workload characteristics during current operations on data. The plurality of states ST1 to STn may correspond to write command ratios, for example.

In detail, in the case where the storage device 1200 has a first workload value, such as the first queue depth QD1 and the first state ST1 (e.g., a state where a write command ratio is 100%), a throttling performance of the storage device 1200 may be "Perf_11". Alternatively, in the case where the storage device 1200 has a second workload value, such as the second queue depth QD2 and the n-th state STn (e.g., a state where a write command ratio is 0%), a throttling performance of the storage device 1200 may be "Perf_2n". The remaining queue depths, the remaining states, and corresponding throttling performances are similar to the above description, and thus, additional description will be omitted to avoid redundancy.

In an example embodiment, as a queue depth becomes greater, a level of a throttling performance may increase; as a write command ratio increases, a level of a throttling performance may decrease. For example, in the case where the first queue depth QD1 is greater than the second queue depth QD2, the throttling performance Perf_11 corresponding to the first queue depth QD1 and the first state ST1 may be higher than the throttling performance Perf_21 corresponding to the second queue depth QD2 and the first state ST1. Alternatively, in the case where a write command ratio of the first state ST1 is greater than a write command ratio of the n-th state STn, the throttling performance Perf ml corresponding to the m-th queue depth QDm and the first state ST1 may be lower than the throttling performance Perf_mn corresponding to the m-th queue depth QDm and the n-th state STn. The above descriptions are exemplary, and the inventive concept is not limited thereto.

The throttling manager 1212 may perform the throttling operation based on the throttling PDT 1211. For example, in the case where the storage device 1200 has the first queue depth QD1 and the first state ST1, the throttling manager 1212 may perform the throttling operation (i.e., may set various operation parameters of the storage device 1200) such that a target performance of "Perf_11" is achieved. Alternatively, in the case where the storage device 1200 has the second queue depth QD2 and the n-th state STn (e.g., a state where the write command ratio is 0%), the throttling manager 1212 may perform the throttling operation (i.e., may set various operation parameters of the storage device 1200) such that a target performance of "Perf_2n" is achieved.

In an example embodiment, the throttling PDT 1211 illustrated in FIG. 5 is exemplary, and the inventive concept is not limited thereto. For example, the throttling PDT 1211 of FIG. 5 may include queue depth and state information associated with a workload, but a workload of the storage device 1200 may be determined based on at least one or a combination of two or more of various information, which are used for the storage device 1200 to operate, such as an external write, an external read, a write amplification factor (WAF), a write queue depth, a read queue depth, a write command ratio, a read command ratio, a write sector size, a read sector size, and temperature information. Stated differently, different data processing characteristics can be combined into a data processing characteristic set to be used in a throttling PDT for associating different values of the data processing characteristics with values of throttling performance.

In an example embodiment, in the case where a workload of the storage device 1200 has changed (e.g., where values of one or more data processing characteristics have changed), the throttling manager 1212 may perform the throttling operation with a throttling performance corresponding to the changed workload (may set various operation parameters of the storage device 1200 such that a target performance indicated by a throttling performance value in the throttling PDT is achieved). However, information about the throttling performance corresponding to the changed workload may be absent from the throttling PDT 1211. In this case, the PDT updating module 1213 of the controller 1210 in the storage device 1200 according to an embodiment of the inventive concept may update the throttling PDT 1211 based on the changed workload and a current performance of the storage device 1200. An update operation of the throttling PDT 1211 of the storage device 1200 will be more fully described with reference to drawings below.

Figure 6A:
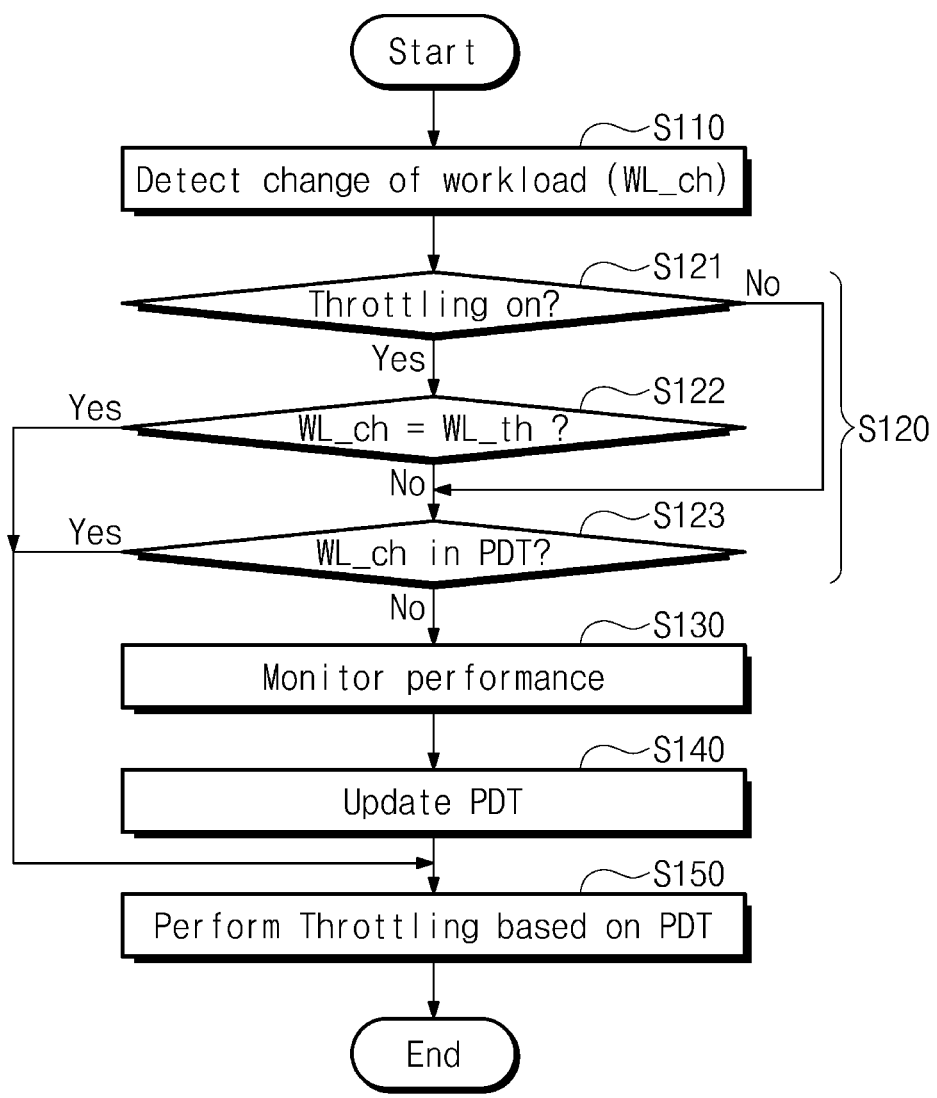
FIGS. 6A and 6B are a flowchart and a state diagram illustrating an operation of a storage device of FIG. 1 according to example embodiments.
Figure 6B:
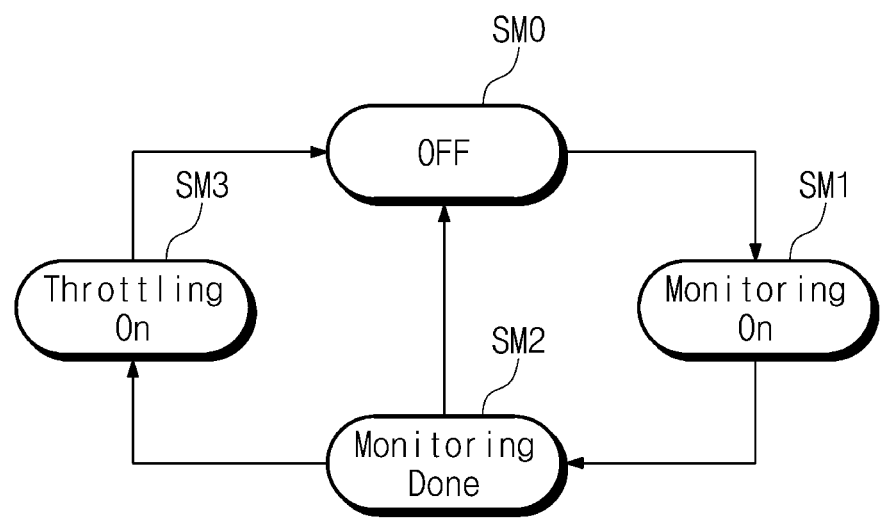

FIGS. 6A and 6B are a flowchart and a state diagram illustrating an operation of the storage device of FIG. 1 according to example embodiments. Referring to FIGS. 1, 6A, and 6B, in operation S110, the storage device 1200 detects a change of a workload or a changed workload WL_ch. For example, a workload may include a number of workload characteristics (e.g., write queue depth, read queue depth, etc.), and a value of one of these workload characteristics may change as a result of a change in the workload. However, in some cases, a throttling PDT may not include certain workload characteristics, since a change in value of these characteristics may not affect performance and/or may not result in any different throttling performance values in the throttling PDT. The PDT updating module 1213 of the storage device 1200 may monitor a workload of the storage device 1200. The PDT updating module 1213 may detect that at least one workload characteristic value is changed while the storage device 1200 is driven.

In operation S120, the storage device 1200 determines whether to update the throttling PDT 1211. For example, operation S120 may include operation S121 to operation S123.

In operation S121, the storage device 1200 determines whether a throttling operation is being currently performed. For example, the throttling manager 1212 of the storage device 1200 may determine whether the throttling operation is being currently performed. When it is determined that the throttling operation is not currently performed, operation S123 is performed. Operation S123 is described below.

When it is determined that the throttling operation is being performed currently, in operation S122, the storage device 1200 determines whether a workload characteristic whose value has changed is stored in the throttling PDT 1211. If the workload characteristic is not in the throttling PDT 1211, it may be determined that the changed workload WL_ch corresponds to the same throttling operation already (previously) being performed, according to the throttling PDT, and thus at least with reference to the throttling PDT, the changed workload WL_ch is identical to a workload WL_th (hereinafter referred to as a "throttling workload") that was previously being performed using a throttling operation (e.g., because the workload characteristic values stored in the throttling PDT have not changed, even though other characteristic values of the workload have changed).

For example, some of various workload characteristics of the storage device 1200 may not be associated with a throttling performance. For example, in the case where a workload characteristic that is not mapped onto a throttling performance is changed, the changed workload WL_ch may be identical to the throttling workload WL_th (in relation to the throttling PDT). In this case, it may be unnecessary to control a separate throttling operation, and thus, the storage device 1200 may continue the throttling operation being currently performed. For example, in the case where the changed workload WL_ch does not result in a changed value in the throttling PDT, in operation S150, the storage device 1200 may maintain the throttling operation being currently performed.

In the case where a workload characteristic included in the throttling PDT and associated with a throttling performance is changed, the changed workload WL_ch characteristic value is different from the previous workload characteristic value. In this case, a throttling performance may be changed. When the storage device 1200 is not currently performing the throttling operation or when values of the changed workload WL_ch characteristics included in the throttling PDT are different from the values of previous workload characteristics stored in the throttling PDT, in operation S123, the storage device 1200 may determine whether information about the changed workload WL_ch is included in the throttling PDT 1211.

Information about the changed workload WL_ch being included in the throttling PDT 1211 means that the throttling PDT 1211 includes information about a throttling performance corresponding to the changed workload WL_ch. For example, when it is determined that the information about the changed workload WL_ch (e.g., a value of a workload characteristic for the changed workload WL_ch) is included in the throttling PDT 1211, in operation S150, the storage device 1200 may perform the throttling operation on the changed workload WL_ch based on the associated throttling PDT 1211.

When the throttling PDT 1211 does not include the information about the changed workload WL_ch, the storage device 1200 may fail to perform a normal throttling operation. In this case, the throttling PDT 1211 may be updated. For example, when it is determined through operation S120 that the changed workload WL_ch is different from the throttling workload WL_th and a changed workload characteristic of the changed workload WL_ch is included in the throttling PDT 1211 but the value of the changed workload characteristic is not included in the throttling PDT 1211, the storage device 1200 may update the throttling PDT 1211 (e.g., to add the new value and an associated, corresponding additional target throttling performance value).

As described above, the storage device 1200 may compare a first workload characteristic set in which the changed workload WL_ch is included (e.g., a value of one of the characteristics has changed) with a second workload characteristic set in which the throttling workload WL_th is included. The storage device 1200 may determine whether to update the throttling PDT 1211, based on a comparison result.

The storage device 1200 may update the throttling PDT 1211 through operation S130 and operation S140. In operation S130, the storage device 1200 may monitor a performance. For example, the PDT updating module 1213 of the controller 1210 of the storage device 1200 may monitor the performance of the storage device 1200 and may calculate an average performance or get a minimum performance of the storage device 1200 based on the monitored performance.

In operation S140, the storage device 1200 may update the throttling PDT 1211 based on the monitored performance. For example, the PDT updating module 1213 may update the throttling PDT 1211 by adding information about the changed workload WL_ch to the throttling PDT 1211 and setting a throttling performance corresponding to the changed workload WL_ch to an average performance or a minimum performance of the storage device 1200 as determined from the monitored performance. As discussed further below, in certain embodiments, the monitored performance is determined without the use of any throttling operation.

After operation S140, in operation S150, the storage device 1200 may perform the throttling operation on the changed workload WL_ch based on the updated throttling PDT 1211.

In an example embodiment, a state mode of the storage device 1200 may be changed while performing operation S130 and operation S140. For example, as illustrated in FIG. 6B, the storage device 1200 may operate in 0-th to third state modes SM0 to SM3. The 0-th state mode SM0 may be an operating mode OFF in which the throttling operation and the monitoring operation are not performed. The first state mode SM1 may be an operating mode "Monitoring ON" for monitoring the performance of the storage device 1200. The second state mode SM2 may be an operating mode "Monitoring Done" in which the monitoring operation is completed. The third state mode SM3 may be an operating mode "Throttling On" in which the throttling operation is performed.

In the third state mode SM3, in the case where the throttling PDT 1211 is to be updated, the storage device 1200 may enter the 0-th state mode SM0. For example, the storage device 1200 may set various operation parameters such that the interface channel IF has a normal performance (i.e., a performance without throttling in which the throttling operation is not applied) in the 0-th state mode SM0. Afterwards, the storage device 1200 may enter the first state mode SM1 to monitor the performance of the storage device 1200. After the monitoring operation is completed, the storage device 1200 may enter the second state mode SM2. Afterwards, depending on whether to perform the throttling operation, the storage device 1200 may enter the third state mode SM3 or the 0-th state mode SM0. In the third state mode SM3, when the workload is changed, the operation parameter set in the 0-th state mode SM0 may be removed.

Figure 7A:
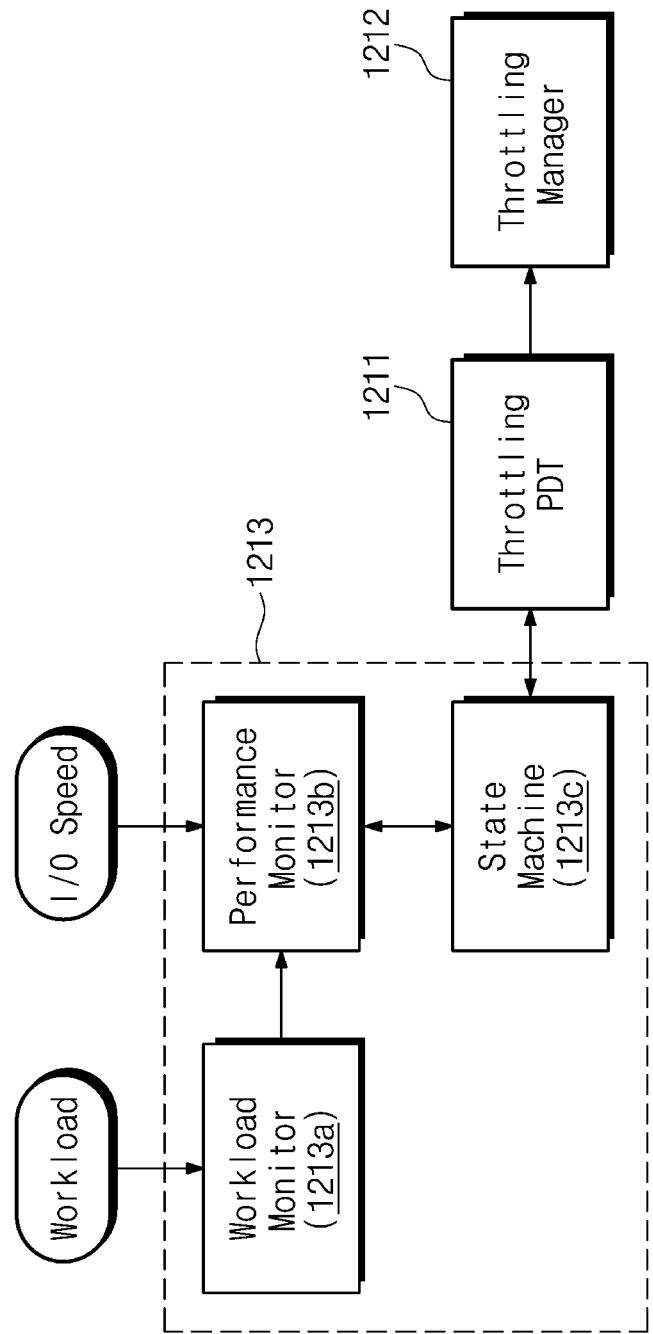
FIGS. 7A and 7B are diagrams for describing an operation according to the flowchart of FIG. 6A according to example embodiments.
Figure 7B:
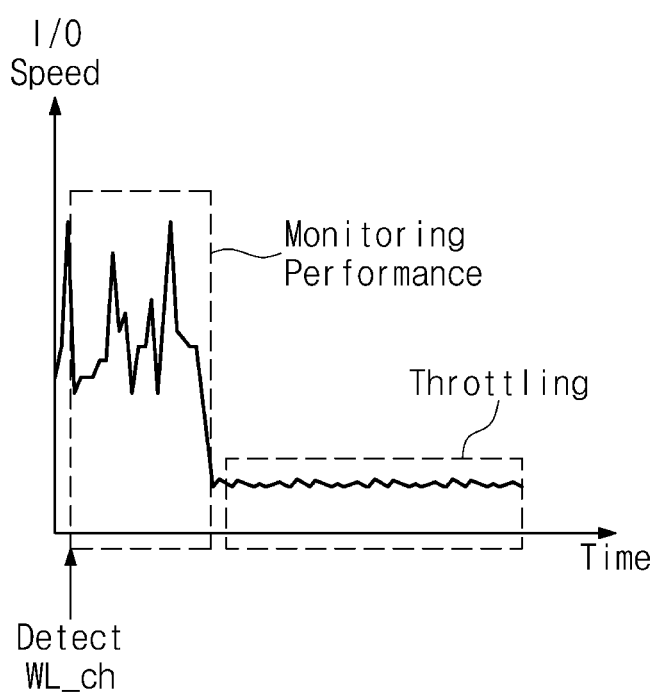

FIGS. 7A and 7B are diagrams for describing an operation of the flowchart of FIG. 6A according to example embodiments. Referring to FIGS. 1, 6A, 7A, and 7B, the controller 1210 may include the throttling PDT 1211, the throttling manager 1212, and the PDT updating module 1213. The PDT updating module 1213 may include a workload monitor 1213*a*, a performance monitor 1213*b*, and a state machine 1213*c*. The throttling PDT 1211 may be stored in a storage, and each of the throttling manager 1212, the PDT updating module 1213, the workload monitor 1213*a*, the a performance monitor 1213*b*, and the state machine 1213*c* may be implemented using a circuit (and may be referred to as a circuit), and may be implemented using hardware and optional software or firmware to carry out the various steps described below.

The workload monitor 1213a is configured to monitor a workload (e.g., monitor various workload characteristics) of the storage device 1200. For example, as described above, the workload of the storage device 1200 may refer to various information about an operation of the storage device 1200, such as an external write, an external read, a write amplification factor (WAF), a write queue depth, a read queue depth, a write command ratio, a read command ratio, a write sector size, a read sector size, and temperature information. The workload monitor 1213a may monitor the above workloads (or combinations thereof) and may detect whether workloads are changed.

The performance monitor 1213b is configured to monitor the performance (e.g., an I/O speed) of the storage device 1200. For example, the performance monitor 1213b may be configured to monitor the performance of the storage device 1200 by using an average window or a moving average window and to calculate an actual average performance or to get an actual minimum performance of the storage device 1200 based on the monitored result.

The state machine 1213c is configured to determine whether to update the throttling PDT 1211 and to update the throttling PDT 1211 based on a determination result. For example, the state machine 1213c may perform operation S120 of FIG. 6 (i.e., operation S121, operation S122, and operation 123 of FIG. 6) in response to a change of a workload detected by the workload monitor 1213a.

In the case where the result of operation S120 indicates that updating the throttling PDT 1211 should occur, the state machine 1213c may request the performance monitor 1213b to monitor a performance (e.g., to determine and calculate a performance). The state machine 1213c may receive information about an average performance or a minimum performance from the performance monitor 1213b and may update the throttling PDT 1211 based on the received information and the changed workload WL_ch. In some cases, the performance monitor 1213b continually monitors performance, and when the state machine 1213c sends a request to the performance monitor 1213b, the performance monitor 1213b simply transmits its current performance measure and analysis to the state machine 1213c.

In an example embodiment, the state machine 1213c may be configured to change a state mode of the storage device 1200 as described with reference to FIG. 6B. For example, in the case where the performance monitoring is used to update the throttling PDT 1211, the state machine 1213c may switch an operating mode of the storage device from the third state mode SM3 or the 0-th state mode SM0 to the first state mode SM1. In the case where the storage device 1200 enters the first state mode SM1, an operating pattern of the storage device 1200 may appear like a block marked by a monitoring performance in a graph of FIG. 7B.

In the case where the performance monitoring of the performance monitor 1213b is completed, the state machine 1213c may switch an operating mode of the storage device 1200 from the first state mode SM1 to the second state mode SM2. Afterwards, depending on whether to perform the throttling operation, the state machine 1213c may switch an operating state of the storage device 1200 to the third state mode SM3. In the case where the storage device 1200 enters the third state mode SM3, an operating pattern of the storage device 1200 may appear like a block marked by throttling in the graph of FIG. 7B.

As described above, the storage device 1200 according to an embodiment of the inventive concept may determine whether to update the throttling PDT 1211, when a workload is changed. In the case where it is determined to update the throttling PDT 1211, the storage device 1200 may stop the throttling operation being performed, may perform the performance monitoring operation, and may perform the throttling operation after the performance monitoring operation is completed. Accordingly, because the throttling operation is dynamically or adaptively performed based on an actual performance of the storage device 1200, performance loss due to the throttling operation may be prevented, and such an issue that the throttling operation is abnormally performed may be prevented.

Figure 8A:
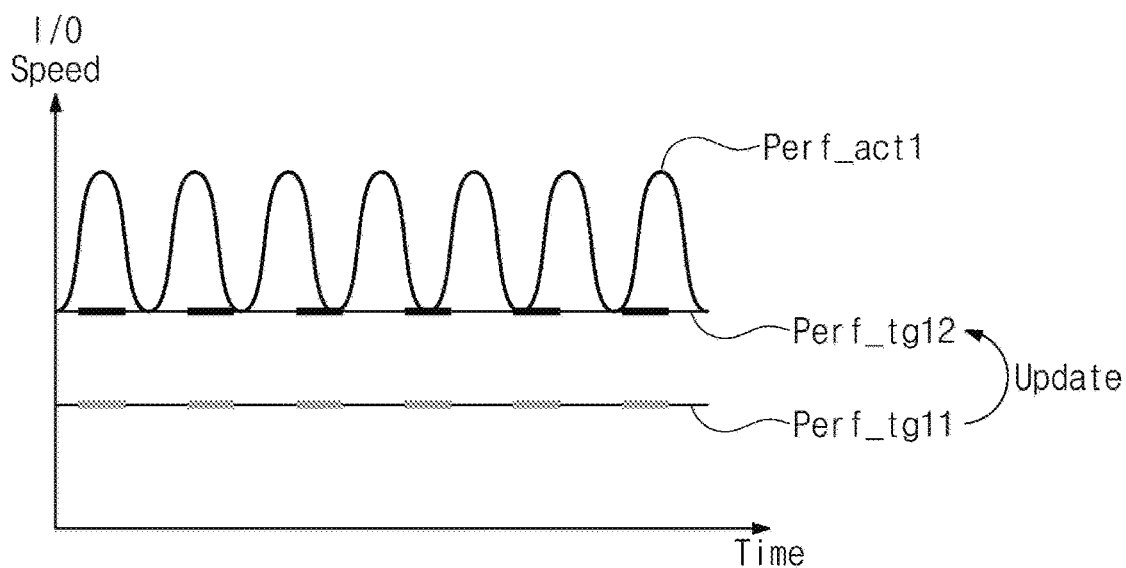
FIGS. 8A and 8B are diagrams for describing an effect that is obtained depending on an operation of a storage device of FIG. 1 according to example embodiments.
Figure 8B:
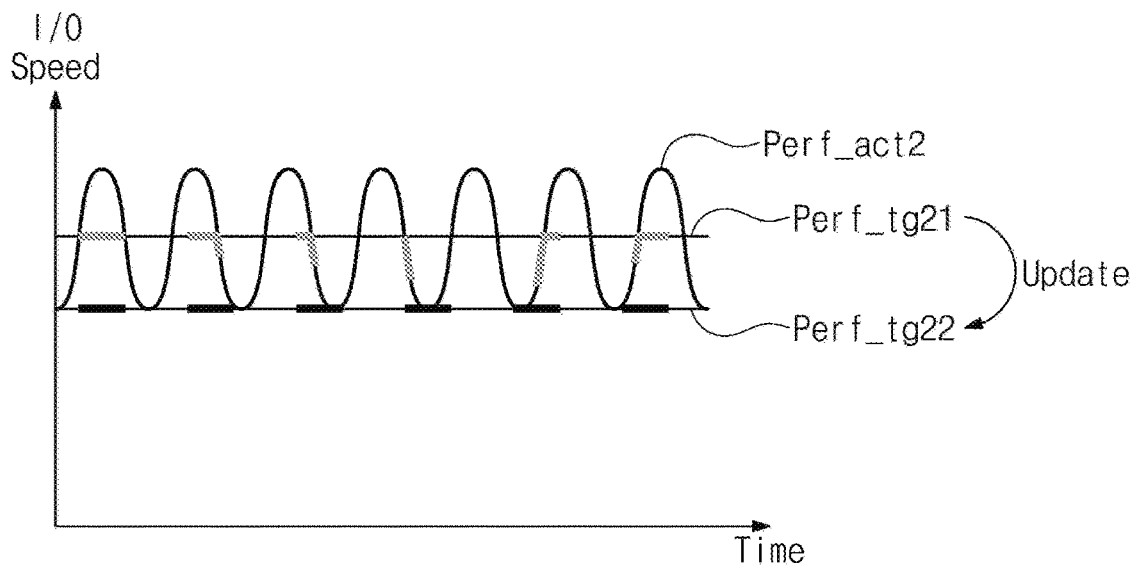

FIGS. 8A and 8B are diagrams for describing an effect that is obtained depending on an operation of the storage device of FIG. 1 according to example embodiments. In FIGS. 8A and 8B, a horizontal axis represents a time, and a vertical axis represents an I/O speed (e.g., MB/s). Because the storage device 1200 according to an embodiment of the inventive concept updates the throttling PDT 1211 based on the actual performance and performs the throttling operation based on the throttling PDT 1211 thus updated, performance loss may be prevented, and an effect of the throttling operation may be improved.

For example, a conventional storage device uses a fixed target performance. In this case, as described with reference to FIG. 2A, in the case where the minimum value of an actual performance of a storage device is higher than the fixed target performance, performance loss occurs. In contrast, as illustrated in FIG. 8A, the storage device 1200 according to an embodiment of the inventive concept may update a target performance for the throttling operation with respect to a first actual performance Perf_act1. For example, the storage device 1200 may increase a target performance for throttling from "Perf_tg11" to "Perf_tg12" based on the first actual performance Perf_act1. In this case, performance loss due to the throttling operation may be prevented. In an embodiment, the "Perf_tg12" may be identical to a minimum performance of the first actual performance Perf_act1. However, the inventive concept is not limited thereto. For example, the "Perf_tg12" may be slightly lower than the minimum performance of the first actual performance Perf_act1.

Alternatively, as described with reference to FIG. 2B, in the case where the minimum value of the actual performance of the storage device is lower than the target performance, an effect that is obtained through the throttling operation may be slight. In contrast, as illustrated in FIG. 8B, the storage device 1200 according to an embodiment of the inventive concept may update the target performance for the throttling operation with respect to a second actual performance Perf_act2 (Perf_tg21→Perf_tg22). For example, the storage device 1200 may decrease the target performance for throttling from "Perf_tg21" to "Perf_tg22" based on the second actual performance Perf_act2. In this case, the effect (i.e., a decrease in performance fluctuations or coherent performance maintenance) of the throttling operation may be improved. In an embodiment, the "Perf_tg22" may be identical to a minimum performance of the second actual performance Perf_act2. However, the inventive concept is not limited thereto. For example, the "Perf_tg22" may be slightly lower than the minimum performance of the second actual performance Perf_act2.

Figure 9:
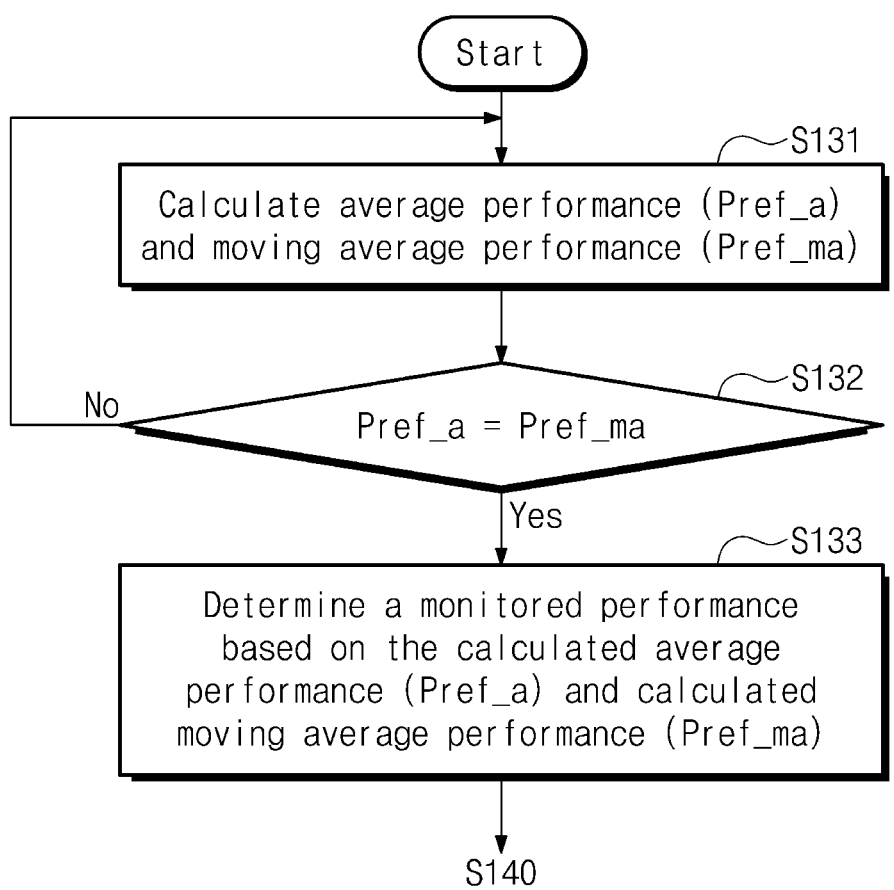
FIG. 9 is a flowchart illustrating an operation of a performance monitor of FIG. 7A according to example embodiments.

FIG. 9 is a flowchart illustrating an operation of the performance monitor of FIG. 7A according to example embodiments. Referring to FIGS. 1, 6A, 7A, and 9, the performance monitor 1213b of the storage device 1200 may perform operation S131 to operation S133. In an example embodiment, operation S131 to operation S133 of the flowchart of FIG. 9 may be included in operation S130 of FIG. 6A.

In operation S131, the performance monitor 1213b may calculate an average performance Perf_a and a moving average performance Perf_ma based on the monitored performance. For example, the performance monitor 1213b may calculate the average performance Perf_a by using an average window in a particular period and may calculate the moving average performance Perf_ma by using a moving average window in a next period.

In operation S132, the performance monitor 1213b may determine whether the average performance Perf_a is identical to the moving average performance Perf_ma. When the average performance Perf_a and the moving average performance Perf_ma are different, respective values may be reset (or, removed), and the performance monitor 1213b again performs operation S131.

When the average performance Perf_a is substantially identical to the moving average performance Perf_ma, in operation S133, the performance monitor 1213b determines a monitored performance of the storage device 1200. For example, the performance monitor 1213b may determine an average performance or a minimum performance of the storage device 1200 based on the calculated average performance Perf_a and the calculated moving average performance Perf_ma. In an embodiment, the target performance of the storage device 1200 for the throttling operation may be determined based on the average performance or the minimum performance.

In an example embodiment, while the performance monitor 1213b of the storage device 1200 performs operation S131 to operation S133 of the flowchart of FIG. 9, the storage device 1200 may maintain the first state mode SM1 (Monitoring On). After operation S133 is completed, the storage device 1200 may enter the second state mode SM2 (Monitoring Done).

Figure 10A:
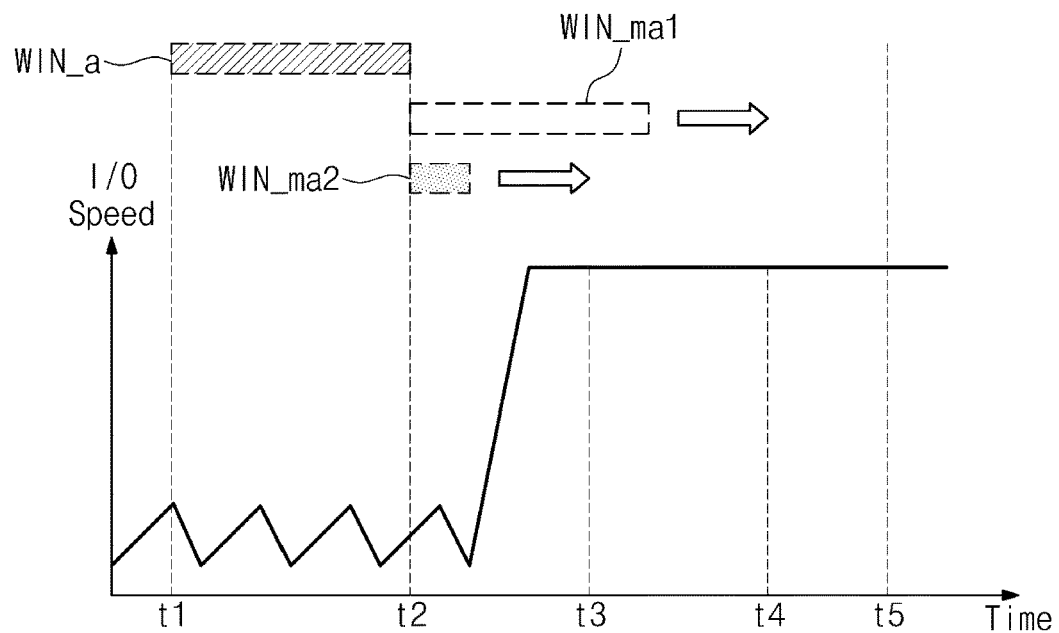
FIGS. 10A and 10B are diagrams for describing an average performance and a moving average performance of a performance monitor according to example embodiments.
Figure 10B:
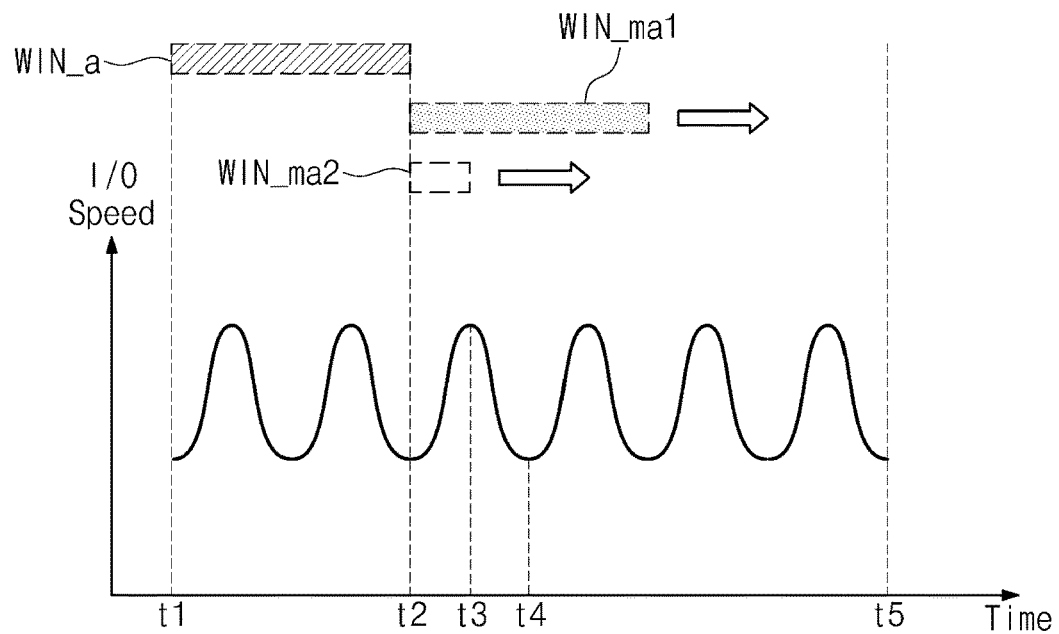

FIGS. 10A and 10B are diagrams for describing an average performance and a moving average performance of a performance monitor according to example embodiments. In FIGS. 10A and 10B, a horizontal axis represents a time, and a vertical axis represents an I/O speed. In an example embodiment, while an operation to be described with reference to FIGS. 10A and 10B is performed, the storage device 1200 may maintain the first state mode SM1 (Monitoring On). In an example embodiment, while the storage device 1200 maintains the first state mode SM1, the storage device 1200 may not perform the throttling operation. In this case, the performance of the storage device 1200 may be fluctuated as much as a given level or higher.

Referring to FIGS. 1, 7A, 9A, 10A, and 10B, the performance monitor 1213b may calculate, based on the monitored performance, the average performance Perf_a by using an average window WIN_a and the moving average performance Perf_ma by using a first moving average window WIN_ma1 and a second moving average window WIN_ma2.

In an example embodiment, the first moving average window WIN_ma1 may be a long-term window having a relatively longer period than the second moving average window WIN_ma2. The first moving average window WIN_ma1 may be used to calculate a moving average performance of the storage device 1200 in a relatively long period. In an example embodiment, the second moving average window WIN_ma2 may be a short-term window having a relatively shorter period than the first moving average window WIN_ma1. The second moving average window WIN_ma2 may be used to calculate a moving average performance of the storage device 1200 in a relatively short period.

For example, as illustrated in FIGS. 10A and 10B, the performance monitor 1213b may calculate the average performance Perf_a by using the average window WIN_a from a first time t1 to a second time t2. After the second time t2, the performance monitor 1213b may calculate the moving average performance Perf_ma by using one of the first and second moving average windows WIN_ma1 and WIN_ma2 depending on a performance pattern of the storage device 1200.

A graph of FIG. 10A shows a performance pattern in which the performance of the storage device 1200 sharply changes. In this case, the second moving average window WIN_ma2 that is relatively short may be useful to calculate the moving average performance. In the graph of FIG. 10A, in the case of using the second moving average window WIN_ma2 that is relatively short, the average performance and the moving average performance may be reset within a relatively short time compared to the case of using the first moving average window WIN_ma1 that is relatively long, and thus, a period of time necessary for the performance monitoring may be shortened. For example, in the performance pattern of FIG. 10A, in the case of using the first moving average window WIN_ma1, because a reset operation is performed after a period of time corresponding to the first moving average window WIN_ma1, the performance monitoring may be completed at a fourth time t4. In contrast, in the performance pattern of FIG. 10A, in the case of using the second moving average window WIN_ma2, because the reset operation is performed after a period of time corresponding to the second moving average window WIN_ma2, the performance monitoring may be completed at a third time t3.

In contrast, a graph of FIG. 10B shows a performance pattern in which the performance of the storage device 1200 oscillates within a particular range. In this case, when the second moving average window WIN_ma2 that is relatively short is used, because the reset operation is repeatedly performed (e.g., the reset operation is performed at times t2 and t3), the performance monitoring may not be accurately performed, or an overhead due to a repeated reset operation may occur. In this case, the performance monitoring may be accurately performed by using the first moving average window WIN_ma1 that is relatively long.

As described above, the performance monitor 1213b according to an embodiment of the inventive concept may use different moving average windows depending on a performance pattern of the storage device 1200. In this case, performance monitoring speed and accuracy of the performance monitor 1213b may be improved.

Figure 11A:
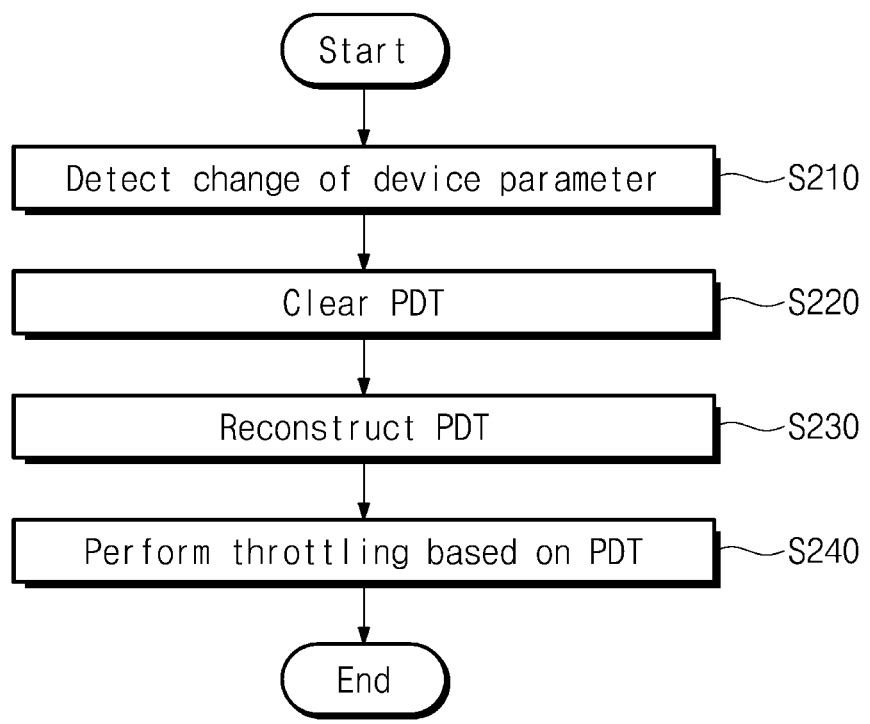
FIGS. 11A and 11B are a flowchart and a graph illustrating an operation of a storage device of FIG. 1 according to example embodiments.
Figure 11B:

FIGS. 11A and 11B are a flowchart and a graph illustrating an operation of the storage device of FIG. 1 according to example embodiments. In FIG. 11B, a horizontal axis represents a program/erase (P/E) cycle of the nonvolatile memory device 1220 of the storage device 1200.

In the above embodiments, when a workload is changed, the storage device 1200 according to an embodiment of the inventive concept may determine whether to update the throttling PDT 1211 and may update the throttling PDT 1211 through a performance monitoring operation depending on a determination result. However, the inventive concept is not limited thereto. For example, under a particular condition, the storage device 1200 or the PDT updating module 1213 may clear (or remove) the throttling PDT 1211 and may reconstruct the throttling PDT 1211.

Referring to FIGS. 1, 11A, and 11B, in operation S210, the storage device 1200 may detect a change of a device parameter. For example, the storage device 1200 may operate based on various device parameters and may detect changes of device parameters. For example, the storage device 1200 may detect a change of the number of P/E cycles of the nonvolatile memory device 1220.

The nonvolatile memory device 1220 may have a lifetime based on the number of P/E cycles. As the number of P/E cycles increases, the performance of the nonvolatile memory device 1220 may be reduced, or various management operations for managing the nonvolatile memory device 1220 may be performed. In this case, the performance of the storage device 1200 (i.e., an I/O speed that is recognized by the host 1100) may be changed or reduced. In this case, in the case where the throttling operation is performed based on the throttling PDT 1211, a target performance may not be provided, or an effect obtained through the throttling operation may be slight.

In response to that a device parameter is changed, in operation S220, the storage device 1200 may clear (or remove) the throttling PDT 1211.

In operation S230, the storage device 1200 may reconstruct the throttling PDT 1211. For example, after removing the throttling PDT 1211, during a given period, the storage device 1200 may monitor performances of various workloads and may reconstruct the throttling PDT 1211 based on the monitored performances. Alternatively, after removing the throttling PDT 1211, during a normal operation that is performed under control of the host 1100, the storage device 1200 may reconstruct the throttling PDT 1211 by updating the throttling PDT 1211 based on the method described with reference to FIGS. 1, 2A, 2B, 3 to 5, 6A, 6B, 7A, 7B, 8A, 8B, 9A, 9B, 10A, and 10B.

In operation S240, the storage device 1200 may perform the throttling operation based on the reconstructed throttling PDT.

In detail, as illustrated in FIG. 11B, the storage device 1200 may remove a first throttling PDT PDT_1 when a P/E cycle of the nonvolatile memory device 1220 reaches a first P/E cycle P/E1. Afterwards, the storage device 1200 may perform the throttling operation while reconstructing a second throttling PDT PDT_2 based on the method described with reference to FIGS. 1, 2A, 2B, 3 to 5, 6A, 6B, 7A, 7B, 8A, 8B, 9A, 9B, 10A, and 10B. Afterwards, when a P/E cycle of the nonvolatile memory device 1220 reaches a second P/E cycle P/E2, the storage device 1200 may remove the second throttling PDT PDT_2 and may reconstruct a third throttling PDT PDT_3 as in the above description. Afterwards, when a P/E cycle of the nonvolatile memory device 1220 reaches a third P/E cycle P/E3, the storage device 1200 may remove the third throttling PDT PDT_3 and may reconstruct a fourth throttling PDT PDT_4 as in the above description.

The above embodiment described as a device parameter is the number of P/E cycles of the nonvolatile memory device 1220, but the inventive concept is not limited thereto. For example, a device parameter may include various parameters that are set in the nonvolatile memory device 1220.

Figure 12:
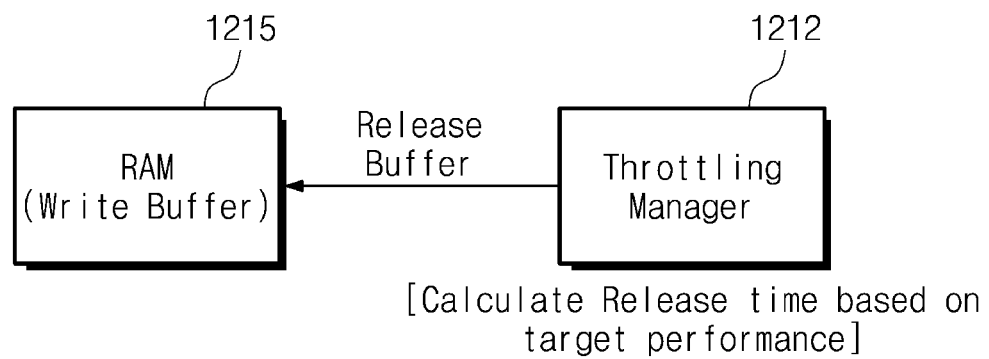
FIG. 12 is a block diagram illustrating a throttling operation of a storage device of FIG. 1 according to example embodiments.

FIG. 12 is a block diagram illustrating a throttling operation of the storage device of FIG. 1 according to example embodiments. Referring to FIGS. 1 and 12, the storage device 1200 may perform the throttling operation. As described above, the throttling operation may indicate an operation of controlling various operation parameters for the purpose of providing the performance of the storage device 1200 uniformly.

For example, the RAM 1215 included in the storage device 1200 may be used as a write buffer of the storage device 1200. In an example embodiment, the RAM 1215 may be included in the controller 1210, but the inventive concept is not limited thereto. The RAM 1215 may be a DRAM that is located outside the controller 1210.

In the case where write data are received from the host 1100, the storage device 1200 may first temporarily store the write data in the RAM 1215 being the write buffer and may then store the write data of the RAM 1215 in the nonvolatile memory device 1220. For example, the performance of the storage device 1200 may be improved by utilizing the write buffer.

In this case, when the RAM 1215 being the write buffer is full of write data, the storage device 1200 may fail to receive write data from the host 1100. In this case, the performance of the storage device 1200 may decrease. The storage device 1200 may further receive write data from the host 1100 by releasing an area, which corresponds to write data stored in the nonvolatile memory device 1220, of a storage space of the RAM 1215.

In some examples, the performance of the storage device 1200 may be controlled by controlling a release time at which the RAM 1215 being the write buffer is released. According to the above scheme, the throttling manager 1212 of the storage device 1200 may calculate a release time based on a target performance and may release the RAM 1215 based on the calculated time. In this case, because the RAM 1215 is released at regular time intervals, write data may be received at regular time intervals. For example, the performance of the storage device 1200 may become uniform.

The above configuration to adjust a release time of the write buffer is an exemplary portion of the throttling operation according to an embodiment of the inventive concept, and the inventive concept is not limited thereto. For example, the storage device 1200 may perform the throttling operation by controlling a time to transfer a response to the host 1100, controlling a queue depth, or controlling various different operation parameters.

As described above, as a workload is changed, the storage device 1200 according to an embodiment of the inventive concept may monitor a performance and may update the throttling PDT 1211 based on the monitored performance. Accordingly, because the throttling operation is performed based on an actual performance of the storage device 1200, reduction of performance or a decrease of an effect of the throttling operation may be prevented.

Figure 13:
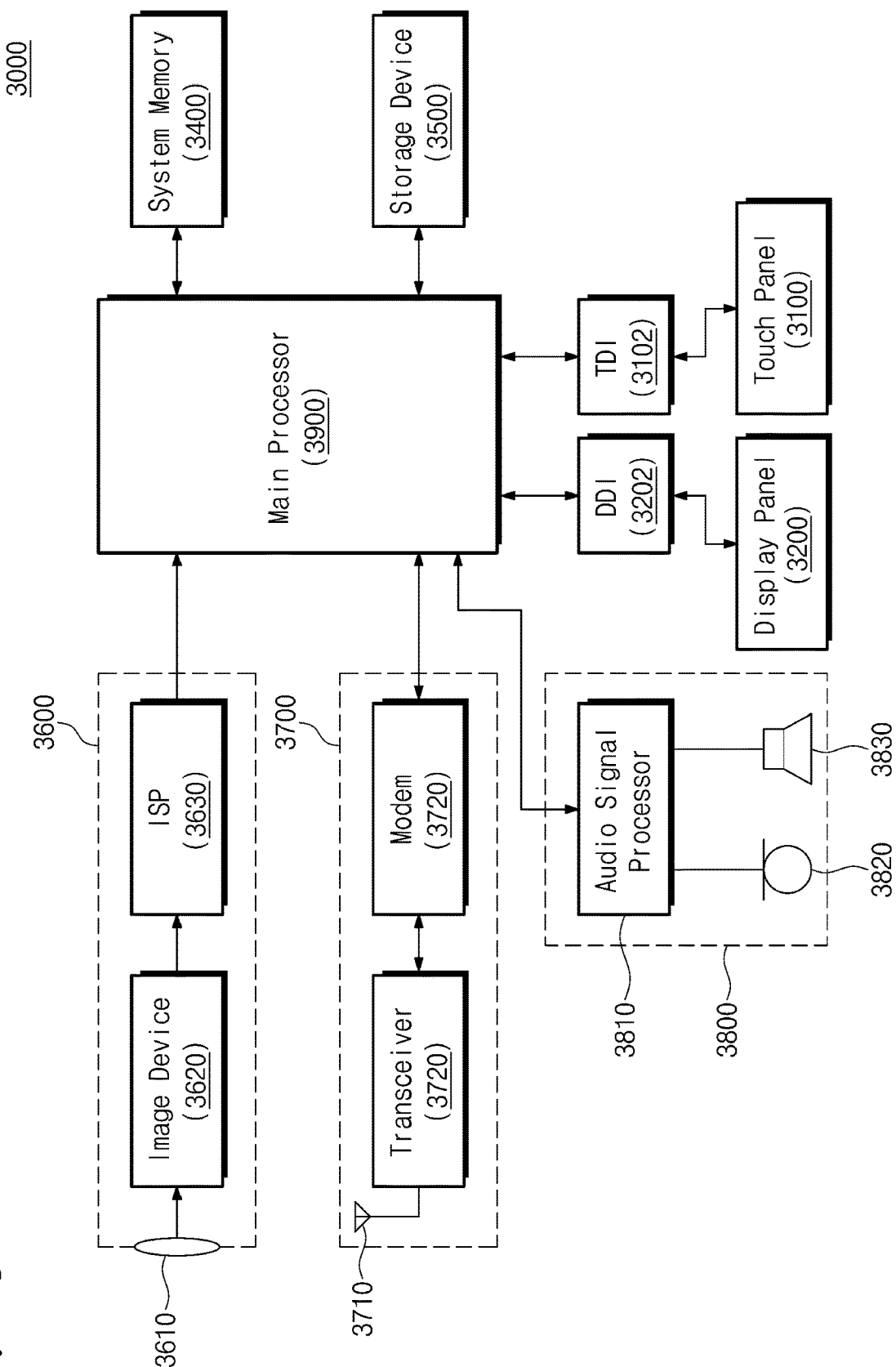
FIG. 13 is a block diagram illustrating an electronic device to which a storage system according to the inventive concept is applied.

FIG. 13 is a block diagram illustrating an electronic device to which a storage system according to the inventive concept is applied. Referring to FIG. 13, an electronic device 3000 may include a touch panel 3100, a touch driver integrated circuit 3102, a display panel 3200, a display driver integrated circuit 3202, a system memory 3400, a storage device 3500, an image processor 3600, a communication block 3700, an audio processor 3800, and a main processor 3900. In an example embodiment, the electronic device 3000 may be one of various electronic devices such as a portable communication terminal, a personal digital assistant (PDA), a portable media player (PMP), a digital camera, a smartphone, a tablet computer, a laptop computer, and a wearable device.

The touch driver integrated circuit 3102 may be configured to control the touch panel 3100. The touch panel 3100 may be configured to sense a touch input from a user under control of the touch driver integrated circuit 3102. The display driver integrated circuit 3202 may be configured to control the display panel 3200. The display panel 3200 may be configured to display image information under control of the display driver integrated circuit 3202.

The system memory 3400 may store data that are used for an operation of the electronic device 3000. For example, the system memory 3400 may temporarily store data processed or to be processed by the main processor 3900. For example, the system memory 3400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 3500 may store data regardless of whether a power is supplied. For example, the storage device 3500 may include at least one of various nonvolatile memories such as a flash memory, a PRAM, an MRAM, a ReRAM, and a FRAM. For example, the storage device 3500 may include an embedded memory and/or a removable memory of the electronic device 3000. In an example embodiment, the storage device 3500 may be the storage device 1200 described with reference to FIGS. 1 to 12 or may operate based on the operation method described with reference to FIGS. 1, 2A, 2B, 3 to 5, 6A, 6B, 7A, 7B, 8A, 8B, 9A, 9B, 10A, 10B, 11A, 11B, and 12.

The image processor 3600 may receive a light through a lens 3610. An image device 3620 and an image signal processor 3630 included in the image processor 3600 may generate image information about an external object, based on a received light.

The communication block 3700 may exchange signals with an external device/system through an antenna 3710. A transceiver 3720 and a modulator/demodulator (MODEM) 3730 of the communication block 3700 may process signals exchanged with the external device/system in compliance with at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The audio processor 3800 may process an audio signal by using an audio signal processor 3810. The audio processor 3800 may receive an audio input through a microphone 3820 or may provide an audio output through a speaker 3830.

The main processor 3900 may control overall operations of the electronic device 3000. The main processor 3900 may control/manage operations of the components of the electronic device 3000. The main processor 3900 may process various operations for the purpose of operating the electronic device 3000. In an example embodiment, a part of the components of FIG. 12 may be implemented in the form of a system on chip and may be provided as an application processor (AP) of the electronic device 3000. In an example embodiment, the main processor 3900 may be the host 1100 described with reference to FIGS. 1, 2A, 2B, 3 to 5, 6A, 6B, 7A, 7B, 8A, 8B, 9A, 9B, 10A, 10B, 11A, 11B, and 12 or may operate based on the operation method described with reference to FIGS. 1, 2A, 2B, 3 to 5, 6A, 6B, 7A, 7B, 8A, 8B, 9A, 9B, 10A, 10B, 11A, 11B, and 12.

Figure 14:
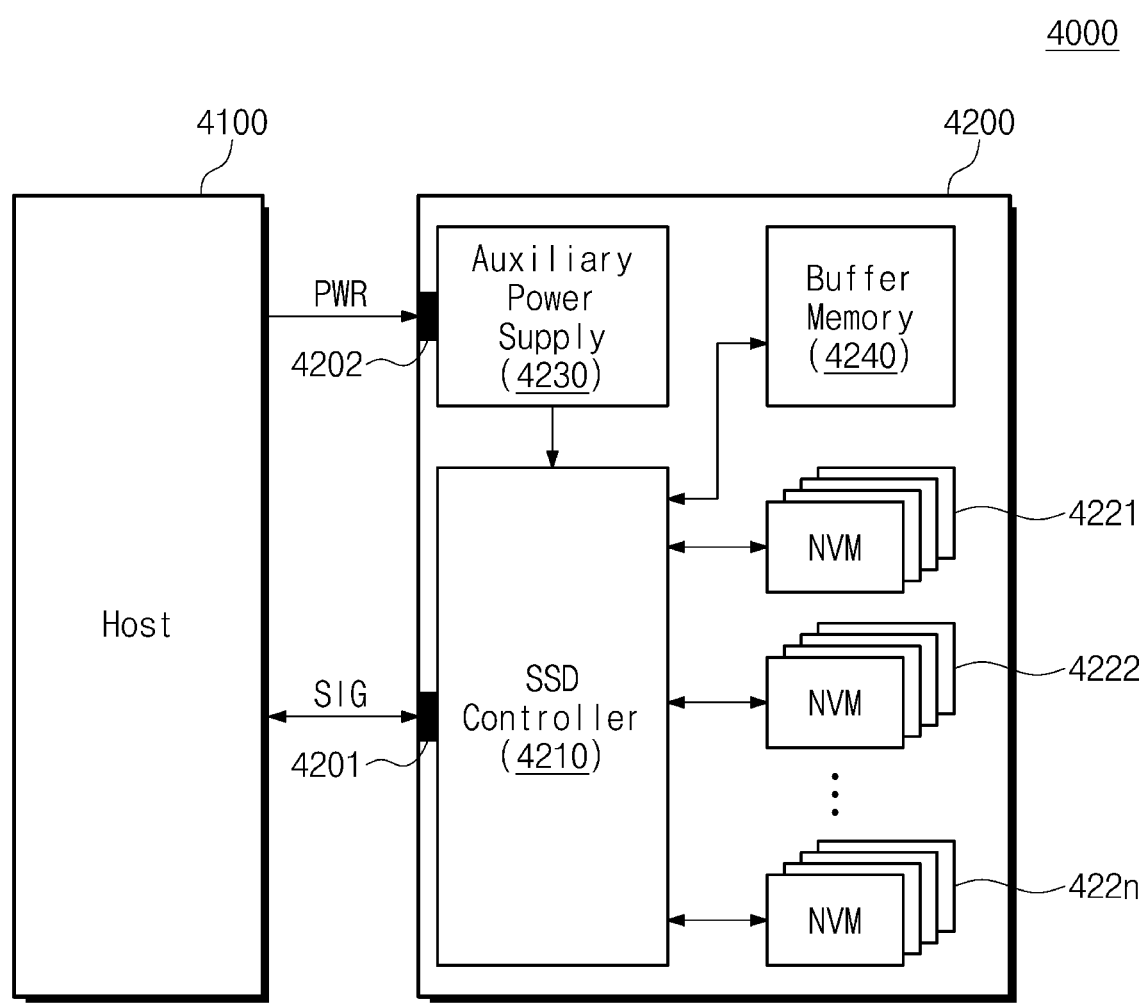
FIG. 14 is a block diagram illustrating an SSD system to which a storage system according to the inventive concept is applied.

FIG. 14 is a block diagram illustrating an SSD system to which a storage system according to the inventive concept is applied. Referring to FIG. 14, a storage system 4000 may include a host 4100 and a storage device 4200. In an example embodiment, the host 4100 and the storage device 4200 may be the host 1100 and the storage device 1200 described with reference to FIGS. 1, 2A, 2B, 3 to 5, 6A, 6B, 7A, 7B, 8A, 8B, 9A, 9B, 10A, 10B, 11A, 11B, and 12 or may operate based on the operation method described with reference to FIGS. 1, 2A, 2B, 3 to 5, 6A, 6B, 7A, 7B, 8A, 8B, 9A, 9B, 10A, 10B, 11A, 11B, and 12.

The storage device 4200 exchanges a signal SIG with the host 4100 through a signal connector 4201 and is supplied with a power PWR through a power connector 4202. The storage device 4200 includes a solid state drive (SSD) controller 4210, a plurality of nonvolatile memories 4221 to 422n, an auxiliary power supply 4230, and a buffer memory 4240.

The SSD controller 4210 may control the nonvolatile memories 4221 to 422n in response to the signal SIG received from the host 4100. The nonvolatile memories 4221 to 422n may operate under control of the SSD controller 4210. The auxiliary power supply 4230 is connected with the host 4100 through the power connector 4202. The auxiliary power supply 4230 may be charged by the power PWR supplied from the host 4100. When the power PWR is not smoothly supplied from the host 4100, the auxiliary power supply 4230 may power the storage device 4200.

The buffer memory 4240 may be used as a buffer memory. In an example embodiment, the storage device 4200 may perform the above throttling operation by controlling operation parameters associated with the buffer memory, but the inventive concept is not limited thereto.

According to embodiments of the inventive concept, a storage device may update a throttling table based on an actual performance and may perform a throttling operation based on the updated throttling table. Accordingly, because an actual performance of the storage device is applied to the throttling operation, an issue such as reduction of performance due to the throttling operation or a decrease of an effect of the throttling operation may be solved.

While the inventive concept has been described with reference to example embodiments thereof, it will be apparent to those of ordinary skill in the art that various changes and modifications may be made thereto without departing from the spirit and scope of the inventive concept as set forth in the following claims.

What is claimed is:

1. An operation method of a storage device configured to communicate with an external device through an interface channel, the method comprising:

storing a throttling predefined table (PDT), the throttling PDT including a relationship between a plurality of target throttling performances and information about a plurality of workload characteristics;

detecting that a value of a first workload characteristic of the plurality of workload characteristics has changed during operation of the storage device;

determining whether to update the throttling PDT;

in response to determining to update the throttling PDT, monitoring a performance of the storage device to calculate a monitored performance;

updating the throttling PDT to include at least one new value for the workload characteristics and an additional target throttling performance value, based on first information including the calculated monitored performance and the changed value of the first workload characteristic;

controlling an operation parameter based on the updated throttling PDT such that the interface channel has a first throttling performance corresponding to the additional target throttling performance value;

receiving a first input/output (I/O) request through the interface channel having the first throttling performance from the external device;

processing a first operation corresponding to the first I/O request through the interface channel having the first throttling performance; and detecting a change of a device parameter of the storage device, wherein the device parameter is a number of program/erase cycles of a nonvolatile memory device of the storage device; and clearing all or a portion of the throttling PDT in response to the number of program/erase cycles of the nonvolatile memory device being changed.

2. The method of claim 1, wherein the first workload characteristic includes one of an external write request, an external read request, a write amplification factor (WAF), a write queue depth, a read queue depth, a write command ratio, a read command ratio, a write sector size, a read sector size, and temperature information.

3. The method of claim 1, wherein determining whether to update the throttling PDT includes:

determining whether the storage device is currently performing a throttling operation;

when the storage device is currently performing the throttling operation, determining whether information about the first workload characteristic is stored in the throttling PDT;

when the first workload characteristic is included in the throttling PDT, determining whether the throttling PDT includes the changed value of the first workload characteristic, and when it is determined that the throttling PDT does not include the changed value of the first workload characteristic, updating the throttling PDT;

when the first workload characteristic is not included in the throttling PDT, determining not to update the throttling PDT.

4. The method of claim 3, wherein when the storage device is currently performing the throttling operation and it is determined to update the throttling PDT, the monitoring of a performance of the storage device is performed after the throttling operation is stopped.

5. The method of claim 1, wherein the monitored performance includes an average performance and a minimum performance of the interface channel having the first throttling performance.

6. The method of claim 5, wherein the monitoring of a performance of the storage device includes:

calculating the average performance of the storage device by using an average window and calculating a moving average performance of the storage device by using a moving average window; and when the average performance and the moving average performance are identical, determining that the interface channel has the first throttling performance.

7. The method of claim 1, wherein detecting a chance of a device parameter is determined when the number of program/erase cycles reaches a reference value.

8. The method of claim 1, wherein the storage device includes a host interface circuit configured to communicate with the external device through the interface channel, and wherein the operation parameter includes information about an operation of the host interface circuit.

9. An operation method of a storage device configured to communicate with an external device through an interface channel, the method comprising:

determining, from among a plurality of target throttling performance values, a first target throttling performance value corresponding to current values for a plurality of workload characteristics, based on a throttling predefined table (PDT) including a relationship between the plurality of target throttling performance values and particular value sets for the plurality of workload characteristics;

setting a first operation parameter such that the interface channel has a first throttling performance that corresponds to the first target throttling performance value;

processing a first input/output (I/O) request received from the external device through the interface channel having the first throttling performance;

in response to deteirmining the value of at least one of the plurality of workload characteristics has changed:

re-setting the at least one operation parameter such that the interface channel has a normal performance without throttling; and monitoring during the normal performance of the storage device to calculate a monitored performance; and updating the throttling PDT to include a new value set for the plurality of workload characteristics and a corresponding additional target throttling performance value, based on the changed value of at least one of the plurality of workload characteristics and the calculated monitored performance; and detecting a change of a device parameter of the storage device, wherein the device parameter is a number of program/erase cycles of a nonvolatile memory device of the storage device; and clearing all or a portion of the throttling PDT in response to the number of program/erase cycles of the nonvolatile memory device being changed.

10. The method of claim 9, further comprising:

selecting a second target throttling performance value corresponding to the new value set based on the updated throttling PDT;

additionally re-setting the at least one operation parameter such that the interface channel has a second throttling performance that corresponds to the second target throttling performance value; and processing a second I/O request received from the external device through the interface channel having the second throttling performance.

11. The method of claim 10, wherein a first average performance and a first fluctuation level of the interface channel having the first throttling performance are different from a second average performance and a second fluctuation level of the interface channel having the second throttling performance, wherein the first fluctuation level is a difference of a first maximum performance and a first minimum performance of the interface channel having the first throttling performance, and wherein the second fluctuation level is a difference of a second maximum performance and a second minimum performance of the interface channel having the second throttling performance.

12. The method of claim 9, wherein the plurality of workload characteristics include an external write request, an external read request, a write amplification factor (WAF), a write queue depth, a read queue depth, a write command ratio, a read command ratio, a write sector size, a read sector size, and temperature information.

13. A storage device comprising:
a nonvolatile memory device; and
a controller configured to control the nonvolatile memory device and to communicate with an external device through an interface channel,
wherein the controller includes:
a host interface circuit configured to communicate with the external device through the interface channel;
a memory configured to store a throttling predefined table (PDT) including a relationship between a plurality of target throttling performance values and a plurality of value sets, each set including a value for each of a plurality of workload characteristics;
a throttling manager circuit configured to determine, from among the plurality of target throttling performance values in the throttling PDT, a first target throttling performance value corresponding to a current operational value set tor the plurality of workload characteristics, and to set at least one operation parameter of the host interface circuit such that the interface channel has a first throttling performance corresponding to the first target throttling performance value; and
a PDT updating module circuit configured to monitor the plurality of workload characteristics, wherein, during operation of the nonvolatile memory device, in response to determining a value of at least one workload characteristic of the plurality of workload characteristics has changed, the PDT updating module circuit monitors a performance of the interface channel to calculate a monitored performance and updates the throttling PDT based on the changed value and the monitored performance; and detecting a change of a device parameter of the storage device, wherein the device parameter is a number of program/erase cycles of the nonvolatile memory device; and
clearing all or a portion of the throttling PDT in response to the number of program/erase cycles of the nonvolatile memory device being changed.

14. The storage device of claim 13, wherein the controller is further configured to process an operation corresponding to an input/output (I/O) request received from the external device through the interface channel having the first throttling performance.

15. The storage device of claim 13, wherein the controller is further configured such that when it is detected that the value of the at least one workload characteristic of the plurality of workload characteristics has changed, the PDT updating module stops a throttling operation by the throttling manager circuit and performs a monitoring operation for the performance of the interface channel.

16. The storage device of claim 15, wherein the controller is configured such that the PDT updating module updates the throttling PDT after the monitoring operation is completed, and
wherein the throttling manager circuit is further configured to determine a second target throttling performance value corresponding to the changed value of the at least one workload characteristic based on the updated throttling PDT and to re-set the at least one operation parameter of the host interface circuit such that the interface channel has a second throttling performance corresponding to the second target throttling performance value.

* * * * *